(12) United States Patent
Lei et al.

(10) Patent No.: US 10,904,847 B2
(45) Date of Patent: Jan. 26, 2021

(54) CLEAN-SLATE SYNCHRONIZATION SIGNAL DESIGN AND CELL SEARCH ALGORITHMS

(71) Applicant: QUALCOMM Incorporated, San Diego, CA (US)

(72) Inventors: Jing Lei, San Diego, CA (US); Hao Xu, Beijing (CN); Peter Gaal, San Diego, CA (US); Xiaofeng Wang, San Diego, CA (US); Wanshi Chen, San Diego, CA (US); Yongbin Wei, La Jolla, CA (US); Juan Montojo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/359,848

(22) Filed: Mar. 20, 2019

(65) Prior Publication Data
US 2019/0239176 A1    Aug. 1, 2019

Related U.S. Application Data

(63) Continuation of application No. 15/245,498, filed on Aug. 24, 2016, now Pat. No. 10,285,144.
(Continued)

(51) Int. Cl.
*H04W 56/00* (2009.01)
*H04L 5/00* (2006.01)
(Continued)

(52) U.S. Cl.
CPC ....... *H04W 56/001* (2013.01); *H04J 13/0062* (2013.01); *H04L 5/0048* (2013.01);
(Continued)

(58) Field of Classification Search
CPC ... H04W 56/001; H04W 16/32; H04W 88/12; H04W 88/08; H04L 5/0048;
(Continued)

(56) References Cited

U.S. PATENT DOCUMENTS 9,674,808 B1    6/2017 Patel et al.
2013/0142165 A1    6/2013 Swarts et al.
(Continued)

FOREIGN PATENT DOCUMENTS

CN    101621493 A    1/2010
CN    101958743 A    1/2011
(Continued)

OTHER PUBLICATIONS

R1-155747, Qualcomm, "Sequence Design for NB-IOT SYNC Channel," Oct. 9, 2015, 3GPP.*
(Continued)

*Primary Examiner* — Jae Y Lee
(74) *Attorney, Agent, or Firm* — Patterson & Sheridan, LLP

(57) ABSTRACT

Aspects of the present disclosure provide techniques for design of synchronization signals for narrowband operation and other clean-slate, OFDM based systems such as enhanced component carrier (eCC) systems. An example method is provided for operations which may be performed by a BS to generate and transmit a dual-layer PSS, and correspondingly, techniques for a UE to detect the dual-layer PSS. The PSS may be generated utilizing a binary code cover and at least one sequence applied to a number of symbols within one or more subframes of a frame.

54 Claims, 21 Drawing Sheets

Related U.S. Application Data

(60) Provisional application No. 62/322,709, filed on Apr. 14, 2016, provisional application No. 62/298,444, filed on Feb. 22, 2016, provisional application No. 62/251,637, filed on Nov. 5, 2015.

(51) Int. Cl.

| | | |
|---|---|---|
| *H04J 13/00* | (2011.01) | |
| *H04W 16/32* | (2009.01) | |
| *H04L 27/26* | (2006.01) | |
| *H04W 88/08* | (2009.01) | |
| *H04W 88/12* | (2009.01) | |

(52) U.S. Cl.
CPC .......... *H04W 16/32* (2013.01); *H04L 5/0007* (2013.01); *H04L 27/266* (2013.01); *H04L 27/2613* (2013.01); *H04L 27/2659* (2013.01); *H04W 88/08* (2013.01); *H04W 88/12* (2013.01)

(58) Field of Classification Search
CPC .............. H04L 27/266; H04L 27/2659; H04L 27/2613; H04L 5/0007; H04J 13/0062
See application file for complete search history.

(56) References Cited

U.S. PATENT DOCUMENTS

| | | | |
|---|---|---|---|
| 2014/0161044 | A1 | 6/2014 | Luo et al. |
| 2017/0135052 | A1 | 5/2017 | Lei et al. |
| 2018/0184390 | A1 | 6/2018 | Wu et al. |
| 2020/0178189 | A1 | 6/2020 | Lei et al. |

FOREIGN PATENT DOCUMENTS

| | | |
|---|---|---|
| CN | 102694763 A | 9/2012 |
| CO | 09072772 | 3/2013 |
| RU | 2562827 C2 | 9/2015 |
| WO | 2011102692 A2 | 8/2011 |

OTHER PUBLICATIONS

R1-161981, "NB-PSS and NB-SSS Design," Mar. 24, 2016, 3GPP.*
Ericsson: "NB-IoT Synchronization Channel Design", 3GPP TSG-RAN #84 WG1, R1-160266, Feb. 15-19, 2016, 5 pgs.
Giannakis B., et al., "Signal Detection and Classification Using Matched Filtering and Higher Order Statistics," IEEE Trans. on Acoustics, Speech and Signal Processing, vol. 38:7, Jul. 1990, 13 pgs.
Huawei., et al., "Synchronization Signal Design",3GPP RAN 1 #83, R1-156464, 5 pgs.
Huawei., et al., "Synchronization Signal Evaluation", 3GPP TSG WG1 NB-IoT Ad-Hoc Meeting, R1-160021, Jan. 18-20, 2016, 6 pgs.
Huawei et al., "Synchronization Signal Evaluation,"3GPP RAN1 Meeting #83, Nov. 15-22, 2015, R1-156465, 35 pgs.
Intel Corporation: "On NB-IoT Primary Synchronization Signal Design", 3GPP TSG RAN WG1 Meeting #84, R1-160410, Jan. 18-20, 2016, 8 pgs.
International Search Report and Written Opinion—PCT/US2016/048545—ISA/EPO—dated Nov. 7, 2016.
LG Electronics: "Synchronization Signal Design for NB-IoT", 3GPP TSG RAN1 #84, R1-160618, Feb. 15-19, 2016, 7 pgs.
Mediatek Inc: "Primary Synchronization Signal Design for NB-IoT", 3GPP TSG RAN WG1 Meeting #84, R1-160834, Feb. 5-19, 2016, 9 pgs.
Minn H., et al., "A robust timing and frequency synchronization for OFDM systems," IEEE Trans. on Wireless Communications, Jul. 2003, 18 pgs.
Morelli M., et al., "An Improved Frequency Offset Estimator for OFDM Applications," IEEE Communications Letters, Mar. 1999, 4 pgs.
Ericsson: "Narrowband LTE-Synchronization Channel Design and Performance", 3GPP Draft; R1-156009, 3rd Generation Partnership Project (3GPP), Mobile Competence Centre; 650, Route Des Lucioles; F-06921 Sophiaantipolis Cedex; France, vol. RAN WG1, No. Malmo, Sweden; 20151005-20151010, Sep. 30, 2015 (Sep. 30, 2015), XP051041885, 31 pages. Retrieved from the Internet: URL: http://www.3gpp.org/ftp/tsg_ran/WG1_RL1/TSGR1_82b/Docs/ [retrieved on Sep. 30, 2015].
Qualcomm Incorporated: "Sequence Design for NB-IOT SYNC Channel", 3GPP Draft; R1-155747, 3rd Generation Partnership Project (3GPP), Mobile Competence Centre; 650, Route Des Lucioles; F-06921 Sophiaantipolis Cedex; France, vol. RAN WG1, No. Malmo, Sweden; 20151005-20151009, Oct. 4, 2015 (Oct. 4, 2015), XP051002572, 4 Pages. Retrieved from the Internet: URL: http://www.3gpp.org/ftp/Meetings_3GPP_SYNC/RAN1/Docs/ [retrieved on Oct. 4, 2015].
Qualcomm Incorporated: "Design Principles of NB-IoT SYNC Channel", 3GPP RAN1 Meeting #83, R1-157068, Nov. 15-22, 2015, XP051003362, Retrieved from the Internet:URL:http://www.3gpp.org/ftp/Meetings_3GPP_SYNC/RAN1/Docs/,6 pages.
Qualcomm Incorporated: "Sequence Design for NB-IoT SYNC Channel", 3GPP RAN1 Meeting #83, R1-157069, Nov. 15-22, 2015, 5 pgs.
Qualcomm Incorporated et al., "NB-C IoT-PSCH design and performance", 3GPP TSG GERAN Adhoc Meeting, Kista, Sweden, GPC150411, Jul. 2015, 15 pgs.
Qualcomm Incorporated: "New York Item: Narrow Band IOT (NB-IOT)", 3GPP TSG RAN Meeting #69, Phoenix, USA, RP-151621, Sep. 14-16, 2015, 9 pgs.
Serpedin E., et al., "Coarse Frame and Carrier Synchronization of OFDM Systems: A New Metric and Comparison," IEEE Trans. on Wireless Communications, Jul. 2004, 15 pgs.
3GPP TSG-RAN WG1 Meeting #84, R1-16xxxx (R1-161548 listed on p. 39 in page cover), "RAN1 agreements for Rel-13 NB-IoT," 15th-19th 2016, pp. 1-59.
Iith et al., "Design Options for NB-PSS and NB-SS", 3GPP DRAFT; R1-160066, 3rd Generation Partnership Project (3GPP), vol. Ran WG1, Jan. 11, 2016, 8 pages.
Kung T-L., et al., "Frequency Domain Symbol Synchronization for OFDM Systems", IEEE International Conference on Electro/Information Technology, 2011.
Taiwan Search Report—TW105127333—TIPO—dated Oct. 14, 2019.
European Search Report—EP20154999—Search Authority—The Hague—dated May 13, 2020.

* cited by examiner

CLEAN-SLATE SYNCHRONIZATION SIGNAL DESIGN AND CELL SEARCH ALGORITHMS

CROSS REFERENCE TO RELATED APPLICATIONS

This application is a continuation of U.S. application Ser. No. 15/245,498, which claims benefit of U.S. Provisional Application Ser. No. 62/251,637, filed Nov. 5, 2015, U.S. Provisional Application Ser. No. 62/298,444, filed Feb. 22, 2016, and U.S. Provisional Application Ser. No. 62/322,709, filed Apr. 14, 2016, all of which are hereby expressly incorporated by reference herein in its entirety.

BACKGROUND

Field of the Disclosure

Certain aspects of the present disclosure generally relate to wireless communications and, more particularly, to design and/or generation of synchronization signals for clean-slate OFDM-based systems and cell search algorithms using the synchronization signals.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communication by a base station (BS). The method generally includes generating a primary synchronization signal (PSS) utilizing a binary code cover and at least one sequence applied to a number of symbols within one or more subframes of a frame, and transmitting the PSS and a secondary synchronization signal (SSS) to a first type of user equipment (UE) that communicates on one or more narrowband regions of a wider system bandwidth.

As will be described in more detail herein, the binary code cover may comprise a length=11 symbol sequence of [1 1 1 1 −1 −1 1 1 1 −1 1]. The at least one sequence may comprise a Zadoff-Chu sequence of size 11 with root index 5. The at least one sequence may be selected from a set of candidate base sequences corresponding to a set of optimized PSS candidates. The set of optimized PSS candidates may be evaluated using an optimization procedure involving a sliding autocorrelation function of candidate sequences for a given binary code cover.

According to aspects, the at least one sequence may comprise a pair of sequences. The pair of sequences may comprise one of orthogonal sequences or quasi-orthogonal sequences. The pair of orthogonal sequences may be determined based, at least in part, on an interpolation of Zadoff-Chu sequences.

According to aspects, the PSS and SSS may be based on a short Zadoff-Chu sequence.

According to aspects, the BS may transmit the PSS and SSS in adjacent subframes in the frame. The number of symbols may be mapped to resource elements that have a same subcarrier spacing as resource elements used to communicate with a second type of UE that communicates on the wider system bandwidth.

According to aspects, the PSS and SSS may be transmitted using resource elements of the one or more subframes not used for communicating with the second type of UE.

The SSS may be used to convey a cell identification (cell ID) and additional system information. The additional system information comprises at least a subframe ID. The SSS may be generated based on quasi-orthogonal sequences.

Certain aspects of the present disclosure provide a method for wireless communications by a first type of user equipment (UE) that communicates on one or more narrowband regions of a wider system bandwidth. The method generally comprises detecting, within the one or more narrowband regions of the wider system bandwidth, a primary synchronization signal (PSS) generated utilizing a binary code cover and at least one sequence applied to a number of symbols within one or more subframes of a frame, performing an initial time and frequency acquisition based on the detected PSS, and detecting, within the one or more narrowband regions, a secondary synchronization signal (SSS) to refine the initial time and frequency acquisition.

The binary code cover may comprise a length=11 symbol sequence of [1 1 1 1 −1 −1 1 1 1 −1 1]. The at least one sequence may comprise a base sequence. The base sequence may comprise a Zadoff-Chu sequence of size 11 with root index 5.

Performing the initial time and frequency acquisition by the UE may involve a sliding auto-correlation procedure of the PSS in the time domain. The sliding auto-correlation procedure may involve performing symbol-wise correlation between adjacent and non-adjacent PSS symbols.

Detection of the PSS may be performed based on PSS re-transmissions over a plurality of subframes. The detection of the PSS may involve coherent accumulation of PSS re-transmissions. The initial time and frequency acquisition may be performed in the time domain.

Performing the initial time acquisition may include performing a coarse and fine symbol boundary estimation for the PSS. Performing the initial frequency acquisition may include performing a fractional frequency offset correction, from the PSS, based on autocorrelation in time domain of the time-synchronized PSS to find a fractional carrier frequency offset (CFO) and performing an integer frequency offset correction, from the PSS, based a cross correlation between the PSS and a replica of the received signal in the time domain, to find an integer CFO of the PSS.

The number of symbols may be mapped to resource elements that have a same subcarrier spacing as resource elements used to communicate with a second type of UE that communicates on the wider system bandwidth. The PSS and SSS may be received using resource elements of the one or more subframes not used for communicating with the second type of UE. The PSS and SSS may be received on adjacent subframes of the frame.

According to aspects, the UE may determine, from the SSS, a cell identification (cell ID) and additional system information. The additional system information may include at least a subframe ID.

The PSS and SSS is may be based on a short Zadoff-Chu sequence.

Certain aspects of the present disclosure provide an apparatus for wireless communication by a base station (BS). The apparatus generally includes means for generating a primary synchronization signal (PSS) utilizing a binary code cover and at least one sequence applied to a number of symbols within one or more subframes of a frame, and means for transmitting the PSS and a secondary synchronization signal (SSS) to a first type of user equipment (UE) that communicates on one or more narrowband regions of a wider system bandwidth.

Certain aspects of the present disclosure provide an apparatus for wireless communication by a first type of user equipment (UE) that communicates on one or more narrowband regions of a wider system bandwidth. The apparatus generally includes means for detecting, within the one or more narrowband regions of the wider system bandwidth, a primary synchronization signal (PSS) generated utilizing a binary code cover and at least one sequence applied to a number of symbols within one or more subframes of a frame, means for performing an initial time and frequency acquisition based on the detected PSS, and means for detecting, within the one or more narrowband regions, a secondary synchronization signal (SSS) to refine the initial time and frequency acquisition.

Certain aspects of the present disclosure provide an apparatus for wireless communication by a base station (BS). The apparatus generally includes at least one processor and a memory coupled with the at least one processor. The at least one processor is generally configured to generate a primary synchronization signal (PSS) utilizing a binary code cover and at least one sequence applied to a number of symbols within one or more subframes of a frame, and transmit the PSS and a secondary synchronization signal (SSS) to a first type of user equipment (UE) that communicates on one or more narrowband regions of a wider system bandwidth.

Certain aspects of the present disclosure provide an apparatus for wireless communication by a first type of user equipment (UE) that communicates on one or more narrowband regions of a wider system bandwidth. The apparatus generally includes at least one processor and memory coupled with the at least one processor. The at least one processor is generally configured to detect, within the one or more narrowband regions of the wider system bandwidth, a primary synchronization signal (PSS) generated utilizing a binary code cover and at least one sequence applied to a number of symbols within one or more subframes of a frame, perform an initial time and frequency acquisition based on the detected PSS, and detect, within the one or more narrowband regions, a secondary synchronization signal (SSS) to refine the initial time and frequency acquisition.

Certain aspects of the present disclosure provide a computer readable medium having instructions stored thereon for causing a base station (BS) to generate a primary synchronization signal (PSS) utilizing a binary code cover and at least one sequence applied to a number of symbols within one or more subframes of a frame, and transmit the PSS and a secondary synchronization signal (SSS) to a first type of user equipment (UE) that communicates on one or more narrowband regions of a wider system bandwidth.

Certain aspects of the present disclosure provide a computer readable medium having instructions stored thereon for causing a first type of user equipment (UE) that communicates on one or more narrowband regions of a wider system bandwidth to detect, within the one or more narrowband regions of the wider system bandwidth, a primary synchronization signal (PSS) generated utilizing a binary code cover and at least one sequence applied to a number of symbols within one or more subframes of a frame, perform an initial time and frequency acquisition based on the detected PSS, and detect, within the one or more narrowband regions, a secondary synchronization signal (SSS) to refine the initial time and frequency acquisition.

Numerous other aspects are provided including methods, apparatus, systems, computer readable mediums, and processing systems.

DETAILED DESCRIPTION

Figure 1:
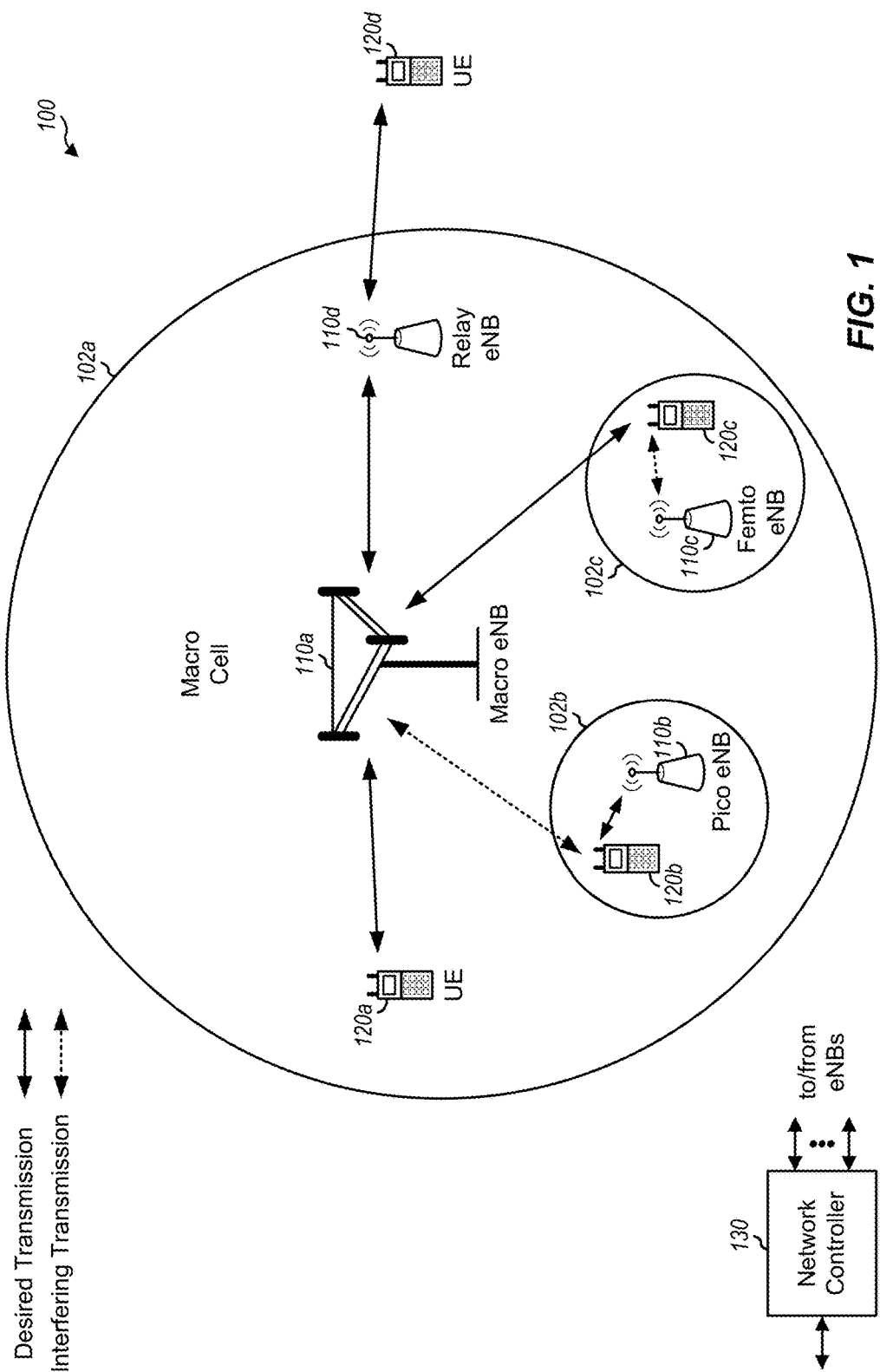
FIG. 1 is a block diagram conceptually illustrating an example of a wireless communication network, in accordance with certain aspects of the present disclosure.

Certain aspects of the present disclosure generally relate to the design of synchronization signals for narrowband operation and corresponding cell searching algorithms. The synchronization signals described herein may be compatible with the legacy OFDM symbol structure and may be used by clean-slate, OFDM-based systems such as devices configured for narrow band Internet-of-Things (NB-IoT) and/or enhanced component carriers (eCC). One example of an eCC system may be a 5G new radio (NR) system. As will be presented in more detail herein, aspects describe (1) algorithms which may be used to identify a desirable code cover and base sequence for generating synchronization signals, (2) transmitting (e.g., by a base station) the generated synchronization signals to a receiving device, and (3) receiving (e.g., by a user equipment) the transmitted synchronization signals. The synchronization signals may be used by the UE for acquiring frequency and timing synchronization and/or other system information.

According to aspects, the at least one base sequence may be selected from a set of candidate base sequences which may correspond to a set of optimized PSS candidates. The set of optimized PSS candidates may be evaluated using an optimization procedure. The optimization procedure may involve a sliding autocorrelation function of candidate sequences for a given binary code cover.

As described herein, a primary synchronization signal (PSS) may be generated using a binary code cover and at least one base sequence. The binary code cover may be a length 11 symbol sequence of [1 1 1 1 −1 −1 1 1 1 −1 1]. The base sequence may comprise a Zadoff-Chu sequence of size 11 with root index 5.

A UE may receive a transmitted PSS, generated using the binary code cover and at least one base sequence and may perform an initial time and frequency acquisition based on the detected PSS. The initial time and frequency acquisition may involve a sliding auto-correlation procedure of the PSS in the time domain. According to aspects, the sliding auto-correlation procedure may involve performing symbol-wise correlation between adjacent and non-adjacent PSS symbols.

The UE may detect, within the one or more narrowband regions, a secondary synchronization signal (SSS) to refine the initial time and frequency acquisition derived from the received PSS.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Example Wireless Communication System

FIG. 1 illustrates an example wireless communication network 100, in which aspects of the present disclosure may be practiced. For example, techniques presented and synchronization signals described herein may be used by one or more BS to communicate with a UE. The UE may communicate on one or more narrowband regions of a wider system bandwidth. Correspondingly, techniques described herein may allow a UE receiver to efficiently search for the transmitted synchronization signal. As described herein, at least one of the synchronization signals may be a dual-layer primary synchronization signal which may co-exist with wide-band LTE systems.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

According to certain aspects, narrowband UEs may be limited to a particular narrowband assignment of 1.4 MHz or six resource blocks (RBs) partitioned out of the available system bandwidth while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
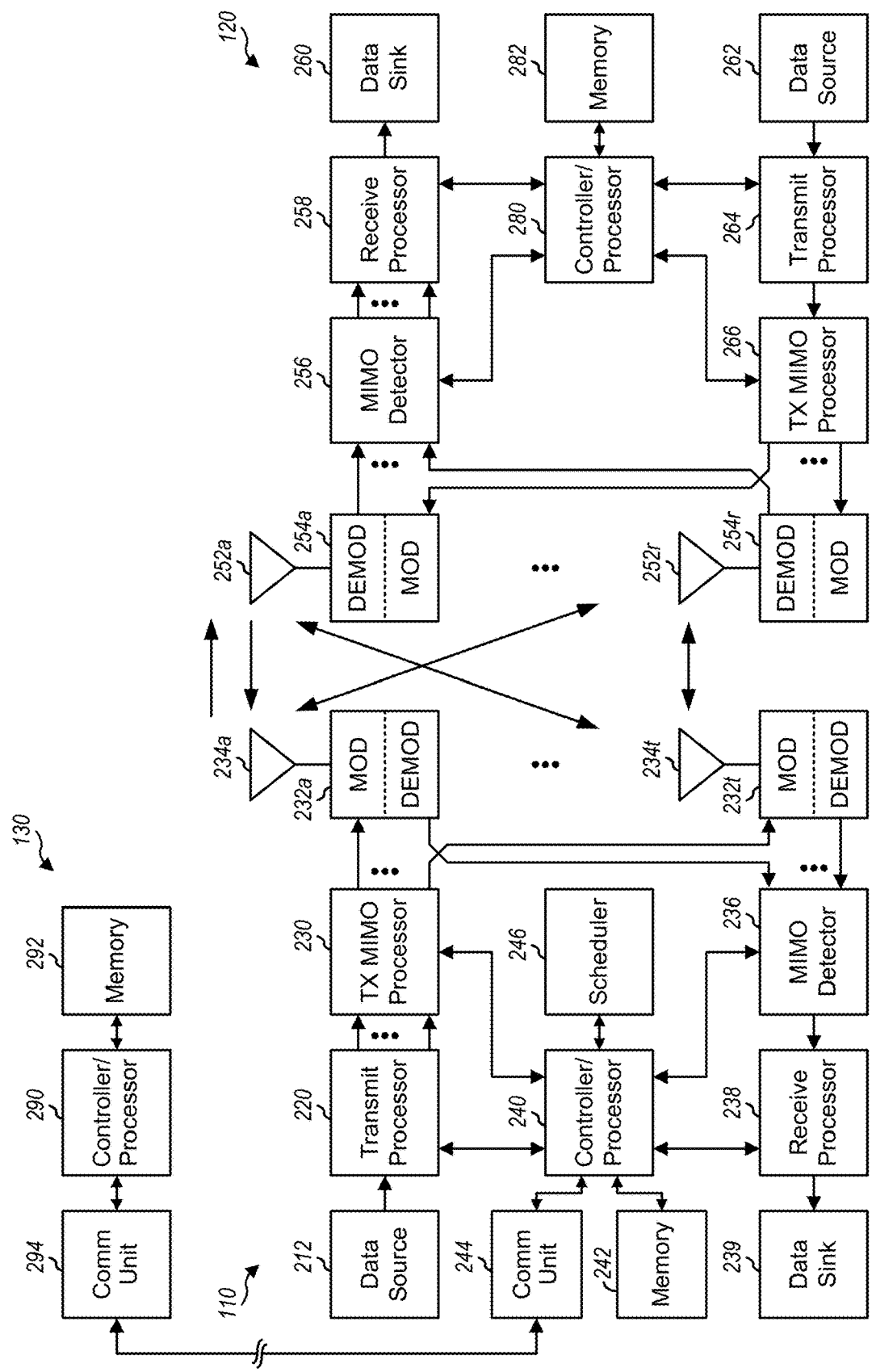
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Further, processor 280 and/or other processors or modules at UE 120 such as the antenna 252 and demod/mod 254, may perform or direct operations described herein and shown in FIG. 6. Processor 240 and/or other processors or modules at base station 110 such as the antenna 234 and demod/mod 232 may perform or direct operations described herein and shown in FIG. 5. Memories 242 and 282 may store data and program codes for base station 110 and UE 120, respectively. A scheduler 246 may schedule UEs for data transmission on the downlink and/or uplink.

Figure 3:
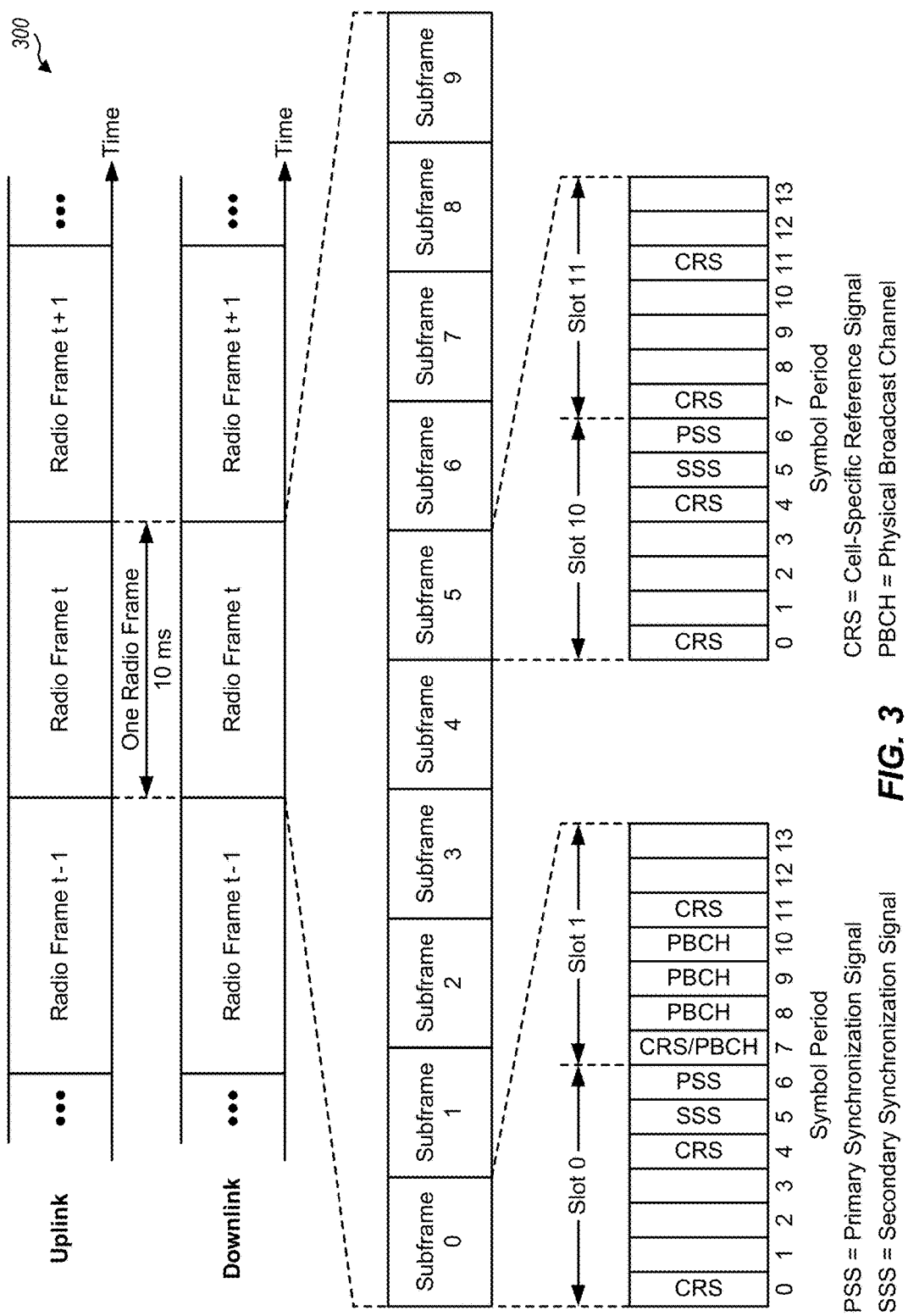
FIG. 3 shows an exemplary frame structure for frequency division duplexing (FDD) in long term evolution (LTE).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, n eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
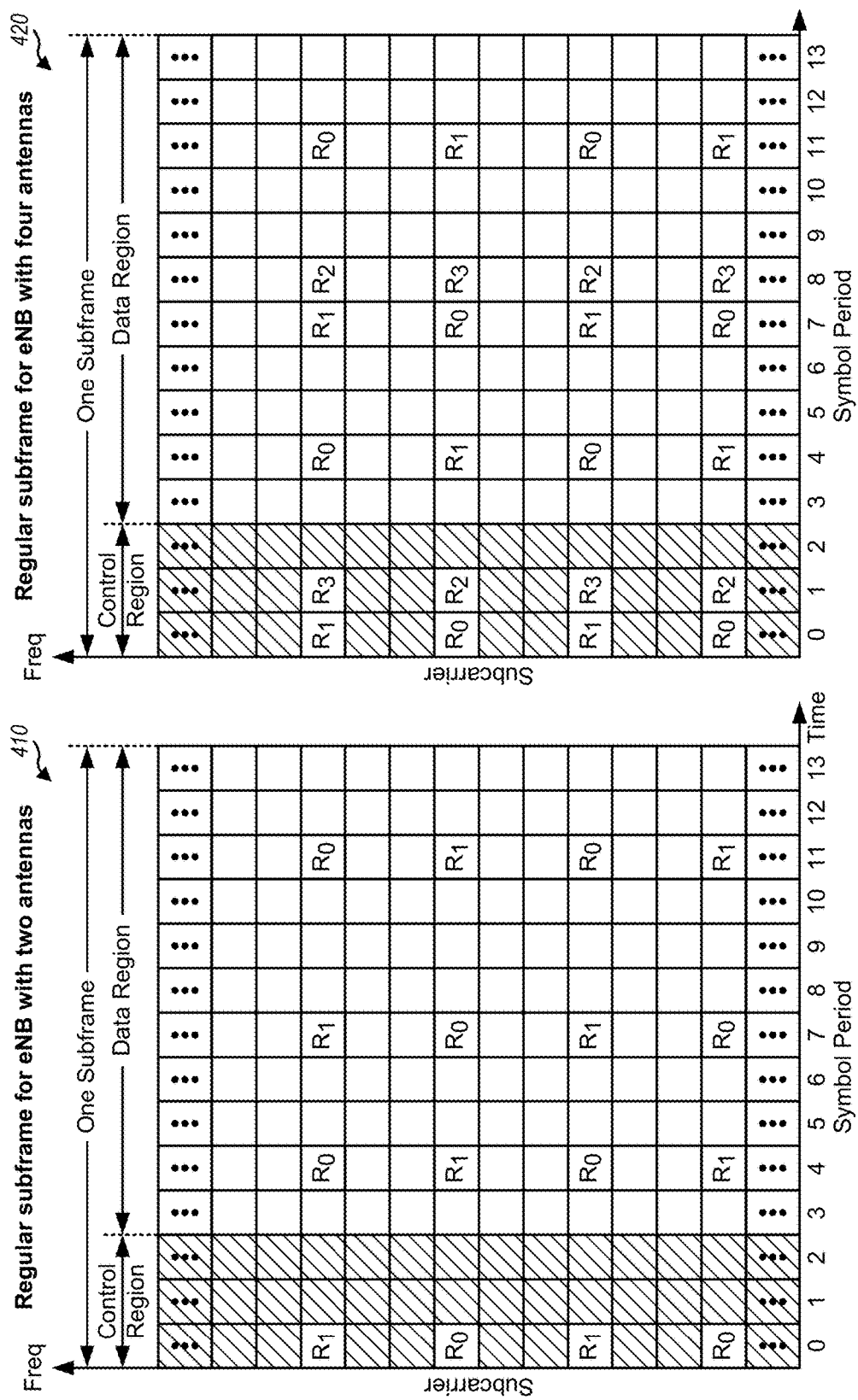
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

One or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, narrowband UEs may have a relaxed switching time to transition from transmitting to receiving (or receiving to transmitting). For example, the switching time may be relaxed from 20 μs for regular UEs to 1 ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband may be limited to a particular narrowband assignment (e.g., of no more than six resource blocks (RBs)) within the available system bandwidth. However, the narrowband may be able to re-tune (e.g., operate and/or camp) to different narrowband regions within the available system bandwidth of the LTE system, for example, in order to co-exist within the LTE system.

As another example of coexistence within the LTE system, narrowband UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition (i.e., the amount of repetition needed for the UE to successfully receive a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may need 150 or more repetitions of the payload in order to successfully receive the payload.

In some cases, for example, for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported.

According to certain aspects, multiple narrowband regions, with each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs). In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as a narrowband device) within a network. One approach for coverage enhancement (CE) is bundling which refers to transmitting the same data multiple times (e.g., across multiple subframes or, as will be described in greater detail below, across multiple symbols within a same subframe).

In certain systems, narrowband UEs may support narrowband operation while operating in a wider system bandwidth. For example, a narrowband UE may transmit and receive in a narrowband region of a system bandwidth. As noted above, the narrowband region may span 6 resource blocks (RBs).

Certain systems may provide narrowband UEs with coverage enhancements of up to 15 dB, which maps to 155.7 dB maximum coupling loss between the UE and an eNB. Accordingly, narrowband UEs and eNB may perform measurements at low signal-to-noise ratios (SNRs e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non-low-cost/non-MTC) types of devices may also communicate vie narrowband regions, for example, taking advantage of frequency selectivity and directional transmissions.

Clean-Slate Synchronization Signal Design and Cell Search Algorithms

Certain aspects of the present disclosure provide a design for synchronization signals, which may be detected by devices that communicate using narrowband regions of a wider system bandwidth, such as narrowband internet of things (NB-IoT) devices. Such synchronization signals may include a PSS, which may be used for frequency and timing synchronization, and a SSS, which may be used to convey system information. According to aspects of the present disclosure, the described synchronization signals may occupy narrow channel bandwidths and may coexist with legacy GSM/WCDMA/LTE system(s) deployed in the same frequency band.

Cell synchronization is one of the initial steps in establishing a communication link between a UE and BS and helps to resolve the timing and frequency uncertainties between the respective transceivers at the UE and BS. A typical cell search procedure may include four operations, namely: (1) signal detection, (2) symbol timing and carrier frequency acquisition, (3) frame timing, and (4) physical cell ID identification. For LTE systems based on narrow band or eCC, the legacy PSS/SSS structure may not be suitable for a reliable cell search by a UE. Therefore, aspects of the present disclosure provide a new synchronization signal structure which may be generated and transmitted by a BS (e.g., eNB). Further, aspects described herein, provide techniques for efficient, low-complexity, low-latency searching algorithms which may be implemented by the UE while searching for a cell.

As will be described in more detail herein, a dual-layer PSS structure may be used for a first type of UE, such as a narrow band Internet-of-Things (NB-IoT) UE or other devices configured to operate in a clean-slate OFDM system (such as eCC). The dual-layer PSS may be generated using a length-L binary code cover and at least one sequence (e.g., a base code, base sequence) applied to a number of symbols within one or more subframes of a frame.

According to one example, the at least one sequence may be a pair of orthogonal or quasi-orthogonal sequences (e.g., pair of orthogonal or quasi-orthogonal base codes). The PSS signal may consists of L PSS symbols. Each of the L PSS symbols may be constructed in time domain by taking the IFFT of the underlying base code, as dictated by the code cover.

Based on the dual-layer PSS structure, a UE may reliably acquire cell timing information through time-domain auto-correlations. Time-domain auto-correlations are advantageously robust against large initial frequency uncertainty. Searching for the dual-layer PSS may significantly outperform existing designs (repetitive Legacy-Short Training Field (L-STF) structure of WiFi, conjugate Zadoff-Chu sequences, differentially encoded Zadoff-Chu sequences, etc.) in both accuracy and complexity, due to the symbol pattern of code cover and orthogonality of PSS symbols.

According to aspects, the SSS may consist of M SSS symbols, and each SSS symbol may be mapped to another set of base codes which may be quasi-orthogonal. With the time and frequency reference provided by the detected PSS, the UE may detect the cell ID through SSS decoding. Due to the quasi-orthogonality of the SSS symbols, the time/frequency drifting effects typical of low-cost designs may be tracked timely and reliably.

In accordance with certain aspects of the present disclosure, the NB-IoT synchronization channel design may be suitable for both in-band and stand-alone deployment scenarios. Furthermore, the proposed synchronization signal design may be extended to other LTE-based MTC deployments using more than 1 RB.

In certain aspects of the present disclosure, in-band deployments of NB-IoT devices may be in compliance with legacy LTE numerology (as in compatible tone spacing and bandwidth). Additionally, the derived NB-IoT PSS and SSS signals may be aligned with the OFDM symbol boundaries of a legacy LTE system.

In some cases NB-IoT synchronization signals may utilize resource elements not occupied by legacy LTE DL physical signals and control channels. The utilization of unoccupied resource elements may avoid resource segmentation and interference issues encountered by other designs. Thus, the synchronization signals described herein may harmoniously co-exist with wide-band LTE systems.

Figure 14:
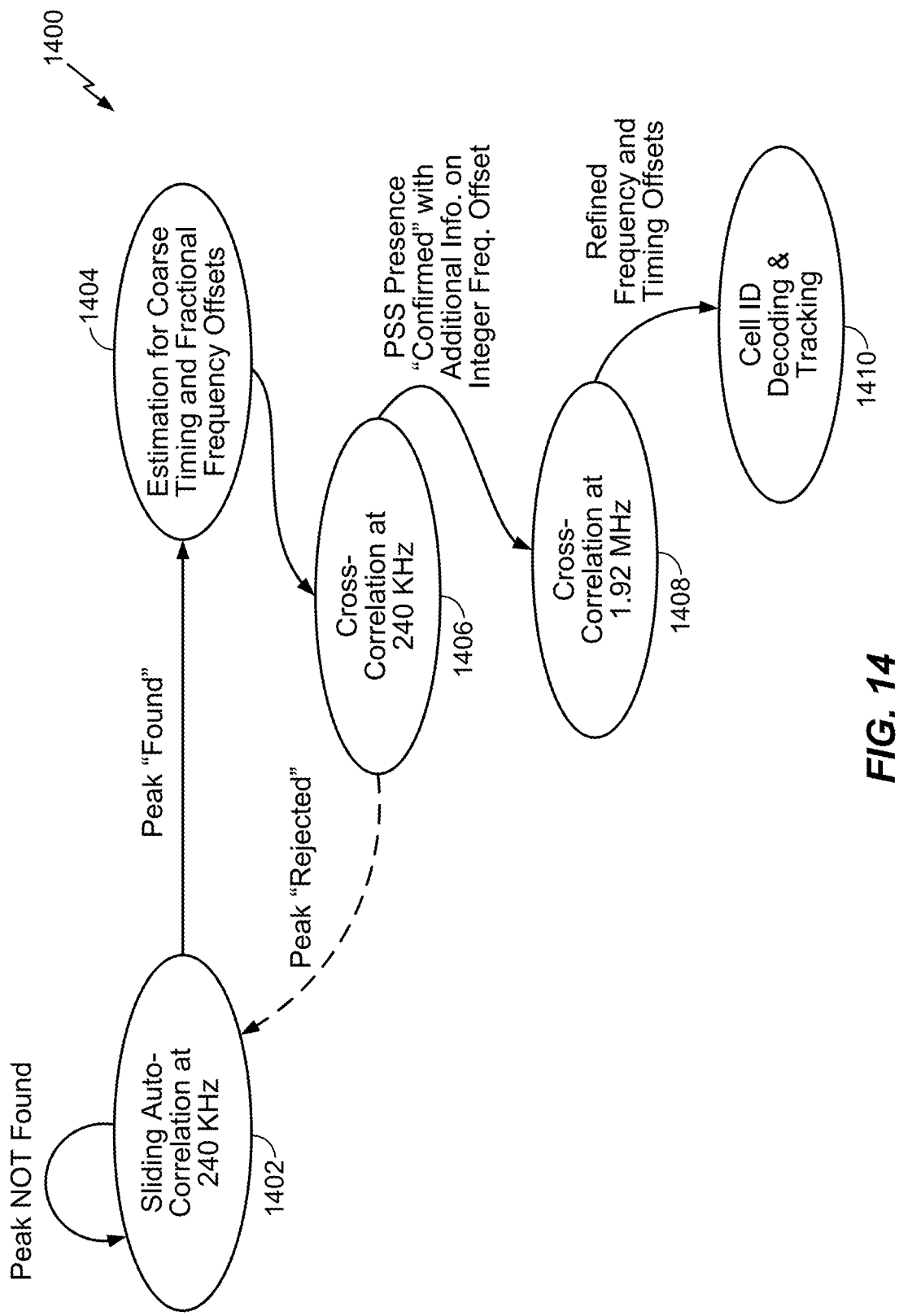
FIG. 14 illustrates an example receiver process flow diagram, according to aspects of the present disclosure.

According to certain aspects (and as shown in FIG. 14), the synchronization signal design presented herein may allow UEs to perform both fractional and integer carrier frequency offsets (CFO) even in deployments with frequency offset up to 20 ppm for initial DL synchronization and achieve a symbol timing accuracy on the order of ±2.5 μs.

The described SSS of the present disclosure may carry more than 13 bits of information, which meets the demand for the increased number of cell IDs associated with the large deployment of IoT devices. In addition to cell ID information, the described SSS may also carry additional system information including, for example, subframe ID and/or other system information.

Figure 5:
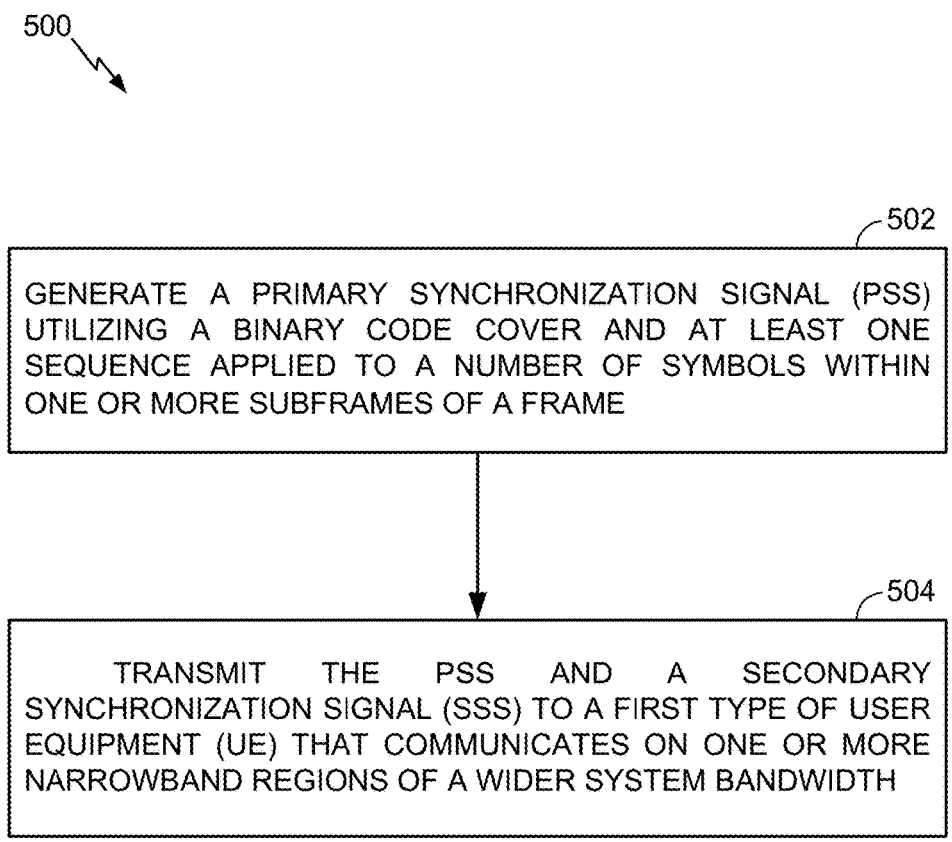
FIG. 5 illustrates example operations that may be performed by a BS, in accordance with certain aspects of the present disclosure.

FIG. 5 illustrates example operations 500 which may be performed by a base station, according to aspects of the present disclosure. The base station may be BS 110 which may include one or more modules illustrated in FIG. 2. According to aspects, one or more of the controller/processor 240, transmit processor 220, transmit MIMO processor 230, memory 242, mod/demod 232, and/or antenna 232 of the BS 110 may be configured to perform the operations described herein.

At 502, the BS may generate a PSS utilizing a binary code cover and at least one sequence applied to a number of symbols within one or more subframes of a frame. At 504, the BS may transmit the PSS and a SSS to a first type of UE that communicates on one or more narrowband regions of a wider system bandwidth. According to aspects, the PSS may be referred to as a narrow band (NB)-PSS and the SSS may be referred to as a NB-SSS.

Figure 6:
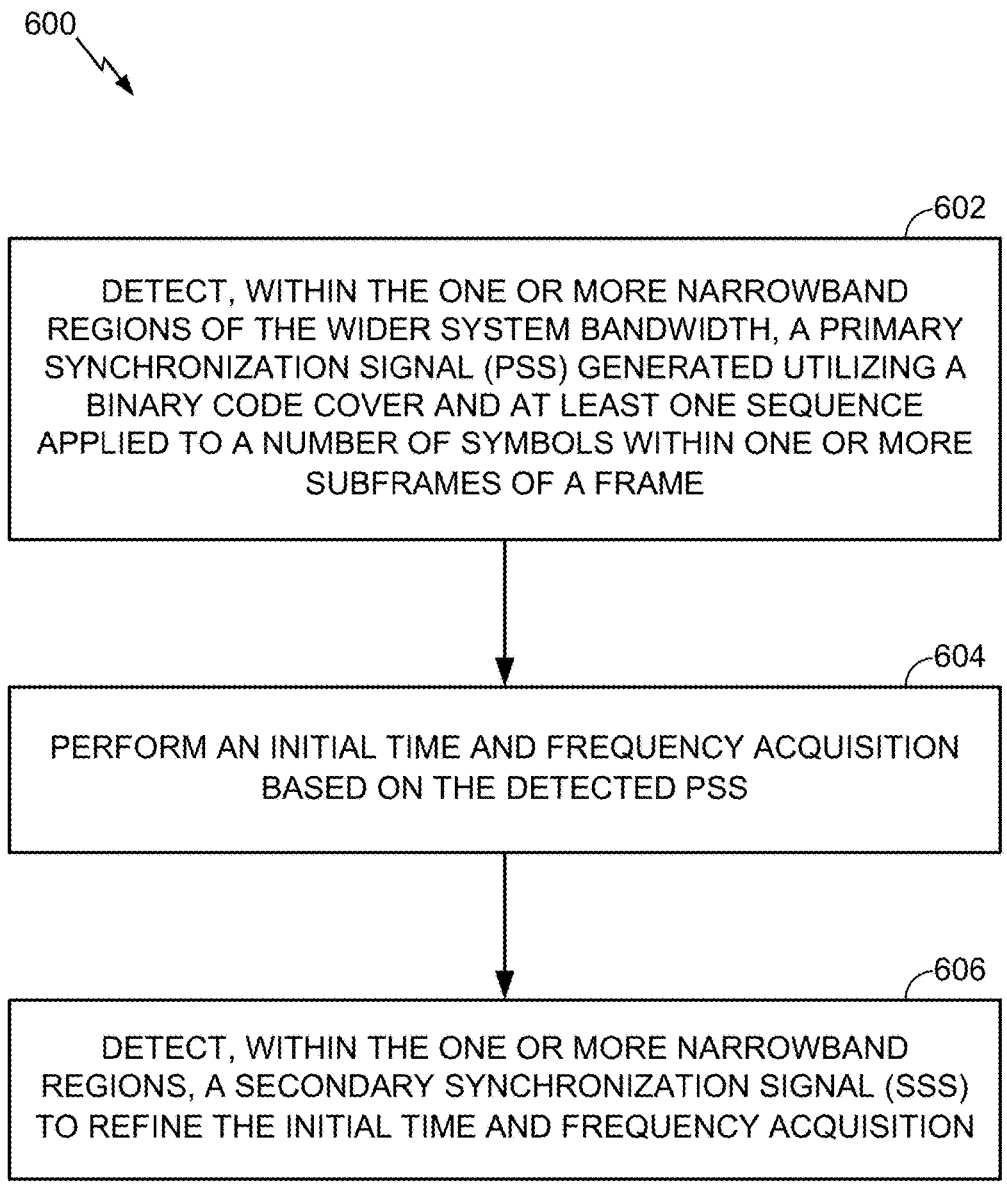
FIG. 6 illustrates example operations that may be performed by a UE that communicates on one or more narrowband regions of a wider system bandwidth, in accordance with certain aspects of the present disclosure.

FIG. 6 illustrates example operations 600 which may be performed by a UE that communicates on one or more narrowband regions of a wider system bandwidth, according to aspects of the present disclosure. The UE may be UE 120 which may include one or more modules illustrated in FIG. 2. According to aspects, one or more of the controller/processor 280, receive processor 258, memory 282, mod/demod 254, and/or antenna 252 of the UE 120 may be configured to perform the operations described herein.

At 602, the UE may detect within the one or more narrowband regions of the wider system bandwidth, a PSS generated utilizing a binary code cover and at least one sequence applied to a number of symbols within one or more subframes of a frame. At 604, the UE may perform an initial time and frequency acquisition based on the detected PSS. At 606, the UE may detect within the one or more narrowband regions, a SSS to refine the initial time and frequency acquisition.

As will be described in more detail herein, the selection of the binary code cover and the base sequence may be important for PSS generation. Based on the binary code cover and base sequence, a dual-layer candidate PSS sequence may be constructed. A sliding autocorrelation function of the candidate dual-layer PSS in time domain may be calculated. Further, the sidelobe-to-peak distance and sidelobe-to-peak strength may be identified. It may be desirable to select a PSS with a large sidelobe-to-peak distance and a low sidelobe-to-peak strength.

A two-dimensional cross-correlation function of the dual-layer candidate PSS sequence may be calculated over a time-frequency grid. According to aspects, the grid dimension in the time domain may be greater than the residual timing offset to be considered, and the grid dimension in the frequency domain may be greater than the residual frequency offset to be considered.

The sliding autocorrelation in the time domain of the candidate PSS sequence, two-dimensional cross correlation function, and PAPR/Cubic Metric (CM) of the candidate PSS may be compared to design targets. Based on the comparison, a PSS candidate may be accepted or rejected as a valid design.

These steps may be repeated in an effort to identify a candidate of best designs. According to aspects, the best designs for PSS may be selected after repeating the above steps based on the length of the Zadoff-Chu sequence and length of the code cover.

Figure 7:
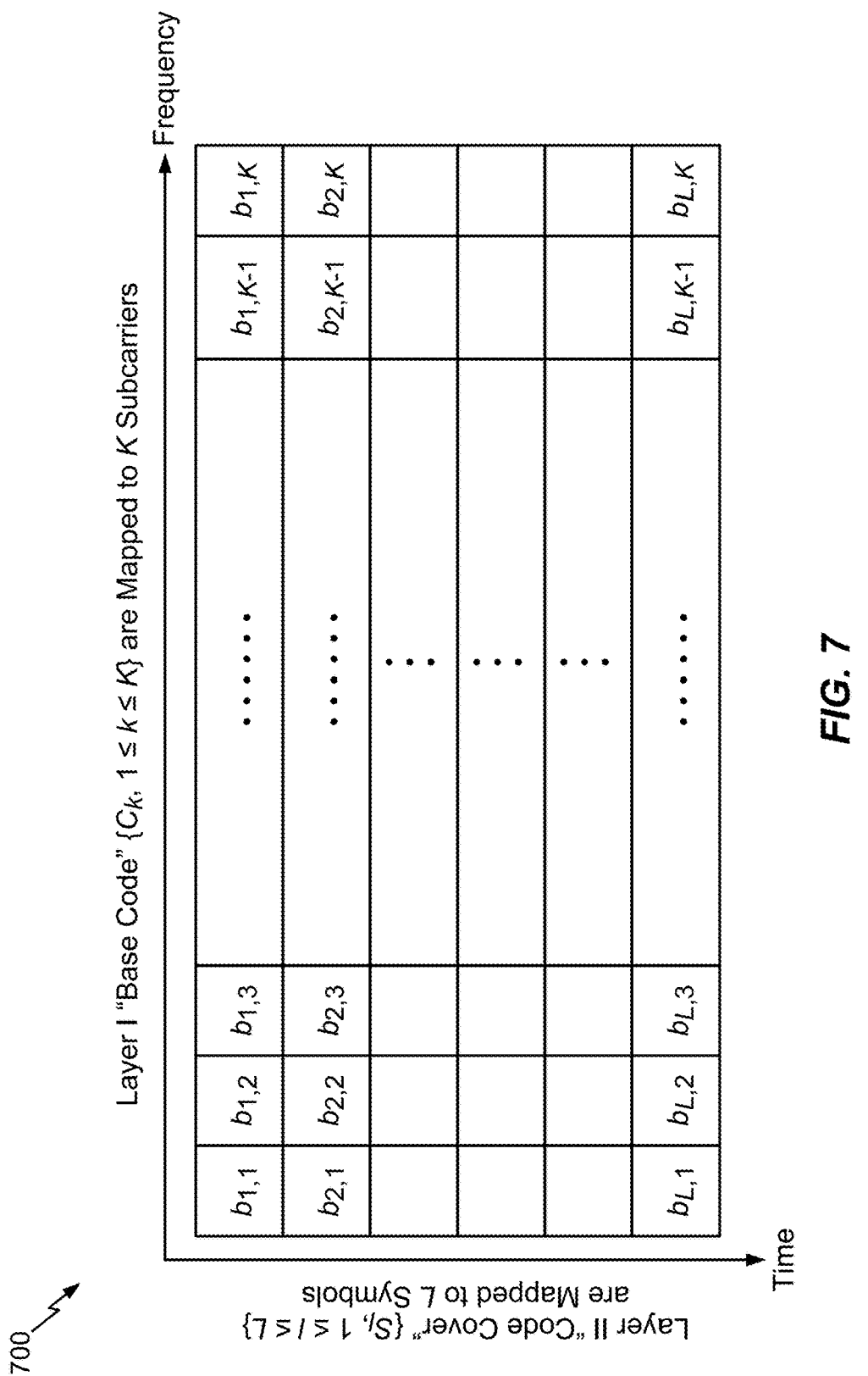
FIG. 7 illustrates an example of dual-layer PSS sequence structure, in accordance with certain aspects of the present disclosure.

FIG. 7 illustrates an example dual-layer PSS sequence structure 700, in accordance with aspects of the present disclosure. As illustrated, the dual-layer corresponds to mapping to L×K localized or distributed resource elements within one LTE physical resource block. For in-band deployment, NB-IoT allocation may avoid the "reserved" resource elements of legacy LTE systems.

The PSS may be designed with L orthogonal frequency-division multiplexing (OFDM) symbols, where L is a configurable integer, and the L PSS symbols can be mapped to localized and/or distributed resource elements. In some cases, all L PSS symbols may be generated by only one Inverse Fast Fourier Transform (IFFT). The subcarrier spacing may be 15 KHz and the bandwidth may be 180 KHz. The PSS may be generated according to a dual-layer sequence design scheme, using a "Base Code" (for Layer I) and a "Code Cover" (for Layer II).

Resource element $b_{l,k}$ of the PSS may be mapped as shown below:

$$b_{l,k} = \begin{cases} C_k, & S_l = 1 \\ -C_k, & S_l = -1 \end{cases}$$

$\{C_k\}$ is a constant-magnitude sequence with good auto-correlation properties in both time and frequency domain.

In certain aspects of the present disclosure, the Base Code (for Layer I) and Code Cover (for Layer II) jointly possess good auto-correlation and cross-correlation behavior. This may improve accuracy as well as time and frequency synchronization by the UE, especially in a low SNR scenario. The selected combination of the Base Code and Code Cover may achieve a large peak-to-side lobe ratio and large peak-to-side lobe distance, which may provide better resolution for the UE. For example, if the UE detects a PSS signal, the UE may better determine the location of the beginning of the PSS sequence. The Base Code and Code Cover may have a low PAPR and cubic metric, have straightforward implementation, and be compatible with the legacy OFDM symbol structure, such that there is minimal interference (if any) between narrow-band and wide-band implementations.

According to aspects, the Base Code (for Layer I) may be based on at least one orthogonal or quasi-orthogonal sequence. The at least one orthogonal or quasi-orthogonal sequence may be based on an interpolation of Zadoff-Chu sequences. The at least one orthogonal or quasi-orthogonal sequence may be used to generate PSS, SSS, and/or PRACH signals.

According to aspects, the at least one orthogonal or quasi-orthogonal sequence may include a pair of orthogonal or quasi-orthogonal sequences for PSS signal construction. Using a pair of sequences may improve the UE's synchronization signal detection capability (e.g., detecting absence vs. presence of a PSS) and timing acquisition accuracy (e.g., location of symbol boundary).

An example of an interpolation algorithm for a Zadoff-Chu sequence of size N and root u is show below:

$$C(n) \triangleq \begin{cases} \exp\left(-j\frac{\pi u n^2}{N}\right), & N \text{ is even} \\ \exp\left(-j\frac{\pi u n(n+1)}{N}\right), & N \text{ is odd} \end{cases}, n = 1, 2, \ldots, N$$

Assuming an interpolation ratio of K, where K is a positive, real number and KN is a positive integer, the interpolated sequence Z may be given by:

$$Z(k) \triangleq \begin{cases} \exp\left(-j\frac{\pi u t^2}{N}\right), & N \text{ is even} \\ \exp\left(-j\frac{\pi u t(n+1)}{N}\right), & N \text{ is odd} \end{cases}, t = \frac{k}{KN}, k = 1, 2, \ldots, KN$$

Figure 8:
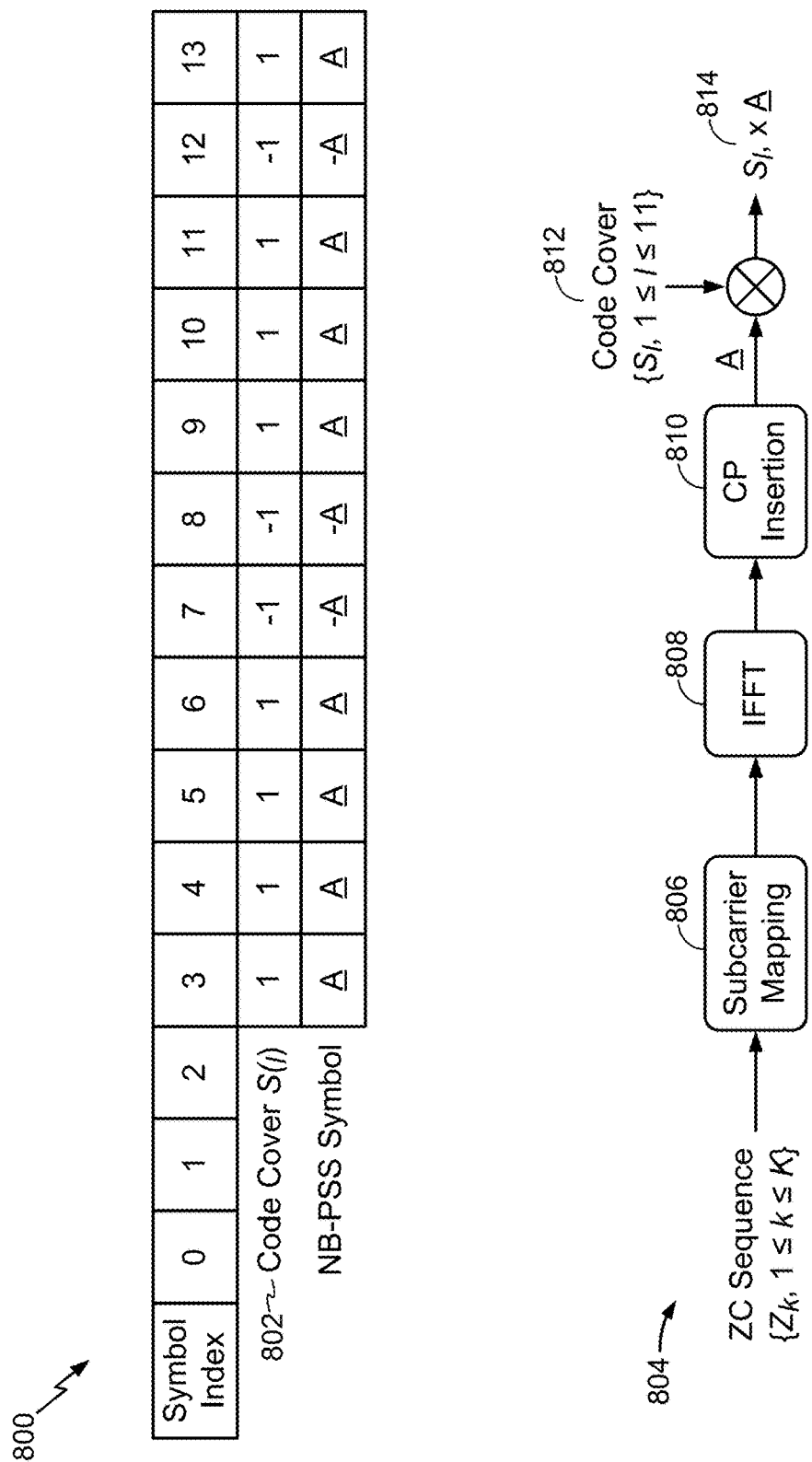
FIG. 8 illustrates an example code cover mapping and dual-layer PSS sequence generation at a transmitter, according to aspects of the present disclosure.

FIG. 8 illustrates an example code cover mapping and dual-layer PSS sequence generation 800, according to aspects of the present disclosure. According to aspects, a BS may generate a NB-PSS symbol based on a code cover and a Zadoff-Chu sequence (a base sequence). The code cover may be a binary code cover with a length of 11 symbols. A code cover optimized to improve the accuracy and reliability of cell acquisition by a UE is shown in FIG. 8 at 802. The optimized binary code cover may be applied across 11 OFDM symbols in the time domain and may be:

$$S_{\{3:13\}} = [1\ 1\ 1\ 1\ -1\ -1\ 1\ 1\ 1\ -1\ 1]$$

Due to the dual-layer structure of the PSS, performance of NB-PSS signal may depend on both the binary code cover and a base sequence. Accordingly, optimizing or improving selection of the binary code cover and the base sequence may be important for PSS generation. According to an aspect, the base sequence may be a short Zadoff-Chu sequence with length K, root index u. The base sequence may be applied across 11 consecutive subcarriers of 1 RB in the frequency domain. A binary code cover with length M (e.g., M<K) may be selected.

FIG. 8, at 804, illustrates an example block diagram for NB-PSS sequence generation, according to aspects of the present disclosure. According to aspects, the NB-PSS may occupy the last 11 OFDM symbols of a subframe (e.g., a Subframe 5). Beginning with a Zadoff-Chu sequence, at 806, tone selection and/or CRS puncturing is performed through subcarrier mapping. The NB PSS may be mapped to 11 consecutive subcarriers of one PRB (e.g., symbols (3-13)).

At 808, zero-padded IFFT may be employed in an effort to generate time domain samples for each PSS symbol. At 810, a cyclic prefix is inserted. Zero-padded IFFT and CP insertion may be similar to legacy LTE.

At 812, a binary code cover is applied to symbols in the time domain to generate, at 814, a PSS. The binary code cover may be the length=11 code cover illustrated at 802. According to aspects, the Zadoff-Chu sequence may be a short Zadoff-Chu sequence of length 11, root index 5, and no cyclic shift.

Figure 9:
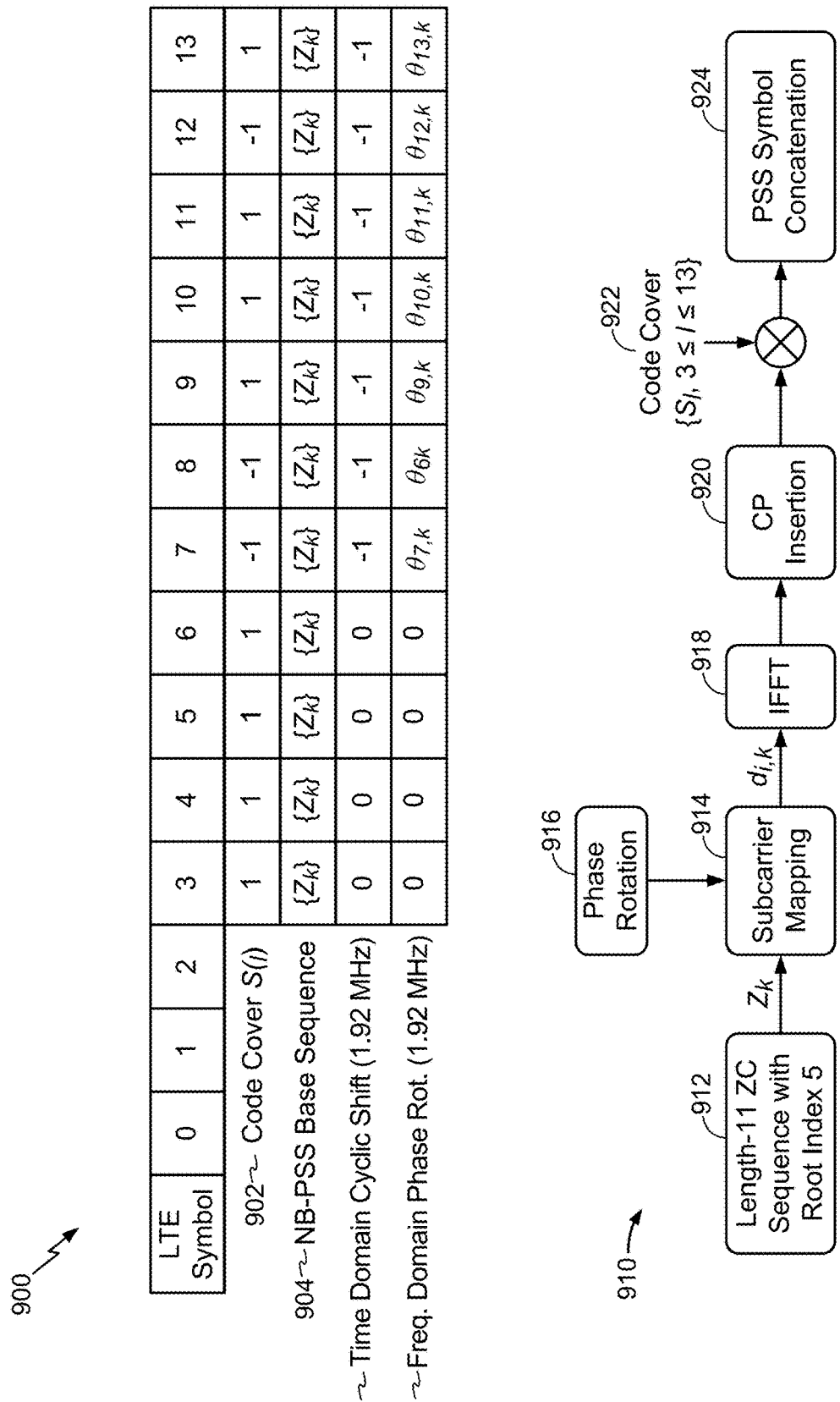
FIG. 9 illustrates an example code cover, base sequence mapping and a dual-layer PSS sequence generation at a transmitter, according to aspects of the present disclosure.

FIG. 9 illustrates an example code cover and base sequence mapping and a dual-layer PSS sequence generation 900, according to aspects of the present disclosure. Similar to FIG. 8, a length=11 binary code cover 902 of S=[1 1 1 1 −1 −1 1 1 1 −1 1] may be applied to 11 OFDM symbols in the time domain, as part of a generating a dual-layer PSS sequence. A base sequence 904 may be applied to the last 11 OFDM symbols to generate a NB-PSS sequence. The base sequence may be:

$$Z_k = \exp\left(\frac{-j5\pi k(k+1)}{11}\right), k = 0, 1, \ldots, 10$$

As shown at 906, a time domain cyclic shift and at 908, frequency domain rotation may be applied to the OFDM symbols to generate the NB-PSS sequence. The phase rotation of the base sequence per PSS symbol may be:

$$d_{l,k} = Z_k \exp(j\theta_{l,k}), k=0,1,\ldots,10; l=3,4\ldots,13$$

FIG. 9, at 910, illustrates an example block diagram for NB-PSS sequence generation, according to aspects of the present disclosure. According to aspects, the NB-PSS may occupy the last 11 OFDM symbols of a subframe (e.g., a Subframe 5). At 912, NB-PSS sequence generation may begin with a Zadoff-Chu sequence of length 11 and a root index 5. A frequency domain phase rotation 916 may be applied to the subcarrier mapping at 914. At 918, zero-padded IFFT may be employed in an effort to generate time domain samples for each PSS symbol. At 920, a cyclic prefix is inserted. Zero-padded IFFT and CP insertion may be similar to legacy LTE. At 922, a binary code cover may be applied to generate the PSS symbol concatenation 924.

Figure 9A:
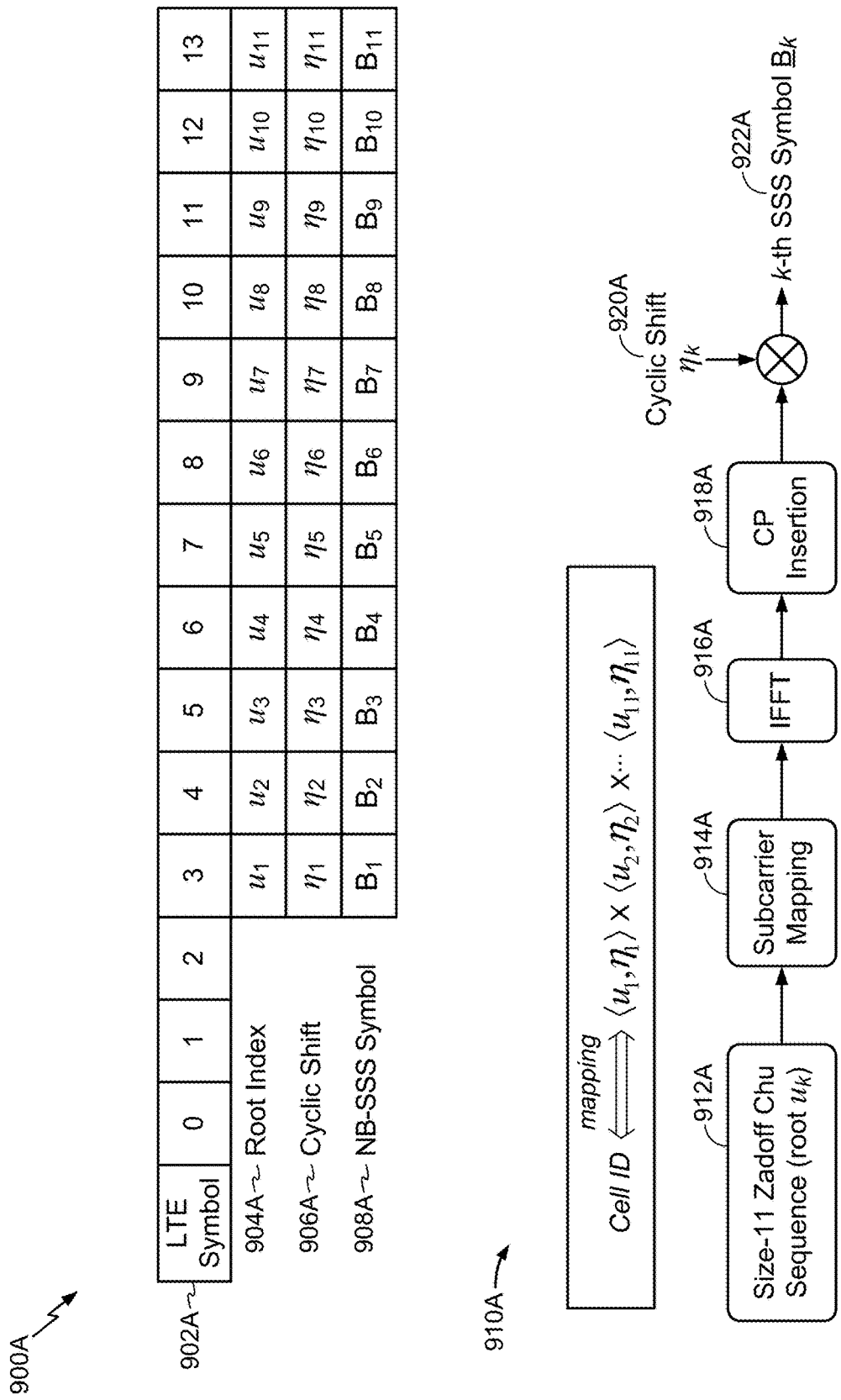
FIG. 9A illustrates an example of NB-SSS generation, according to aspects of the present disclosure.

FIG. 9A illustrates an example of NB-SSS generation 900A, according to aspects of the present disclosure. In line with the design and generation of an NB-PSS signal, an NB-SSS signal may be constructed based on the concatenation of length-11 Zadoff-Chu sequences with different root indices and cyclic shifts. For example, a root index 904a $u_1$-$u_{11}$ and cyclic shift 906a may be applied to LTE symbols 3-13 (902A), respectively, to generate NB-SSS symbols 908A.

Similar to NB-PSS, NB-SSS signal may be mapped to the last 11 OFDM symbols of a LTE subframe (e.g., subframe 9 of radio frames with odd index) in time domain, and may occupy 11 consecutive tones of 1 PRB. On the other hand, to communicate cell ID and additional system information, each NB-SSS symbol can use a distinctive combination of root index and cyclic shift. For example, as shown below, the k-th SSS symbol $B_k$ may be represented in frequency domain by a size-11 Zadoff-Chu sequence with root index $u_k$ and cyclic shift $\eta_k$ $$Z_{k,m} = \exp\left(\frac{-j\pi u_k(m+\eta_k)(m+\eta_k+1)}{11}\right), m = 0, 1, \ldots, 10$$

910A illustrates a block diagram for NB-SSS sequence generation, according to aspects of the present disclosure.

Among all possible permutation of root index and cyclic shift, the NB-SSS may be limited to a subset that satisfies one or more of good auto-correlation and cross-correlation among all NB-SSS sequences, low cross-correlation with NB-PSS sequence, minimal false alarm for NB-PSS detection, and low PAPR/CM.

Similar to NB-PSS generation shown at 804, the NB-SSS may be generated beginning with a Zadoff-Chu sequence, at 912A, and tone selection and/or CRS puncturing performed through subcarrier mapping at 914A. At 916A, IFFT may be employed in an effort to generate time domain samples for each SSS symbol. At 918A, a cyclic prefix may be inserted. IFFT and CP insertion may be similar to legacy LTE.

At 920A, a cyclic shift may be applied to symbols to generate, at 922A, a SSS symbol.

Figure 10:
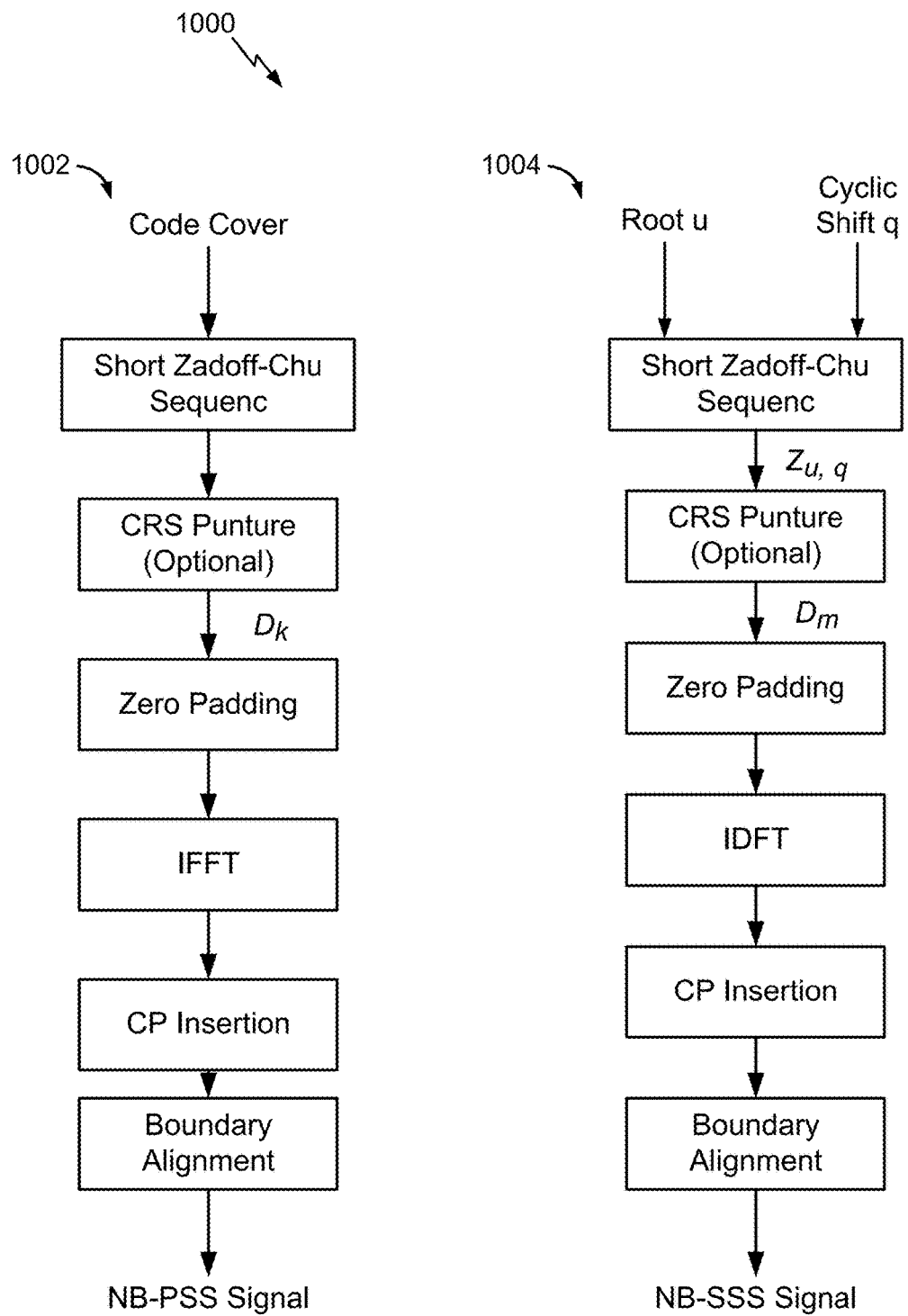
FIG. 10 illustrates example steps for generating a PSS and SSS according to aspects of the present disclosure.

FIG. 10 illustrates example steps 1000 for generating a NB-PSS 1002 and NB-SSS 1004 according to aspects of the present disclosure. As illustrated, assuming a cyclic shifted short Zadoff-Chu sequence of length $K_1$, the PSS symbols may be generated by CRS puncturing, Zero-Padding, IFFT, CP insertion, and boundary alignment. Assuming a cyclic shift q, Root u, and a short Zadoff-Chu sequence of length $K_2$, SSS symbols may be generating by performing CRS puncturing, Zero-Padding, IDFT, CP insertion, and boundary alignment.

While FIGS. 8-10 refer to generation of synchronization signals based on a short Zadoff-Chu sequence, according to aspects, each PSS and SSS symbol may be based on a full Zadoff-Chu sequence. Regardless of using a short or full Zadoff-Chu sequence, correlation between PSS and SSS sequences may be minimized by considering different root index and/or cyclic shifts.

Thus, according the example and as illustrated in FIG. 8, the NB-PSS may be constructed by concatenation of short Zadoff-Chu sequences. Additionally, the NB-PSS may employ a dual-layer design for base sequence (across 11 consecutive subcarriers of 1 physical resource block in frequency domain) and code cover (across 11 OFDM symbols in time domain).

The base sequence may be constructed in time domain by interpolating a Zadoff-Chu sequence of length-K (K=11) with good correlation properties in both time and frequency domain. Each PSS symbol may embrace one base sequence (CP included). The one-to-one mapping from PSS symbols to base sequences may be governed by a binary code cover of length 11.

The code cover may comprise a binary sequence {$S_l$; $S_l=\pm1$ and $1 \le l \le 11$} with random-like pattern. As described above, the pattern of the code cover may be optimized in an effort to improve the accuracy and reliability of cell acquisition.

According to one example, through joint optimization of code cover and base sequence, the following combination of base sequence and code cover may be used for generated a NB-PSS signal:

Base Sequence:

$$Z_k = \exp\left(\frac{-j5\pi k(k+1)}{11}\right), k = 0, 1, \ldots, 10$$

Code Cover:

$$S_{\{1:11\}} = [1\ 1\ 1\ -1\ -1\ 1\ 1\ 1\ -1\ 1]$$

Figure 17:
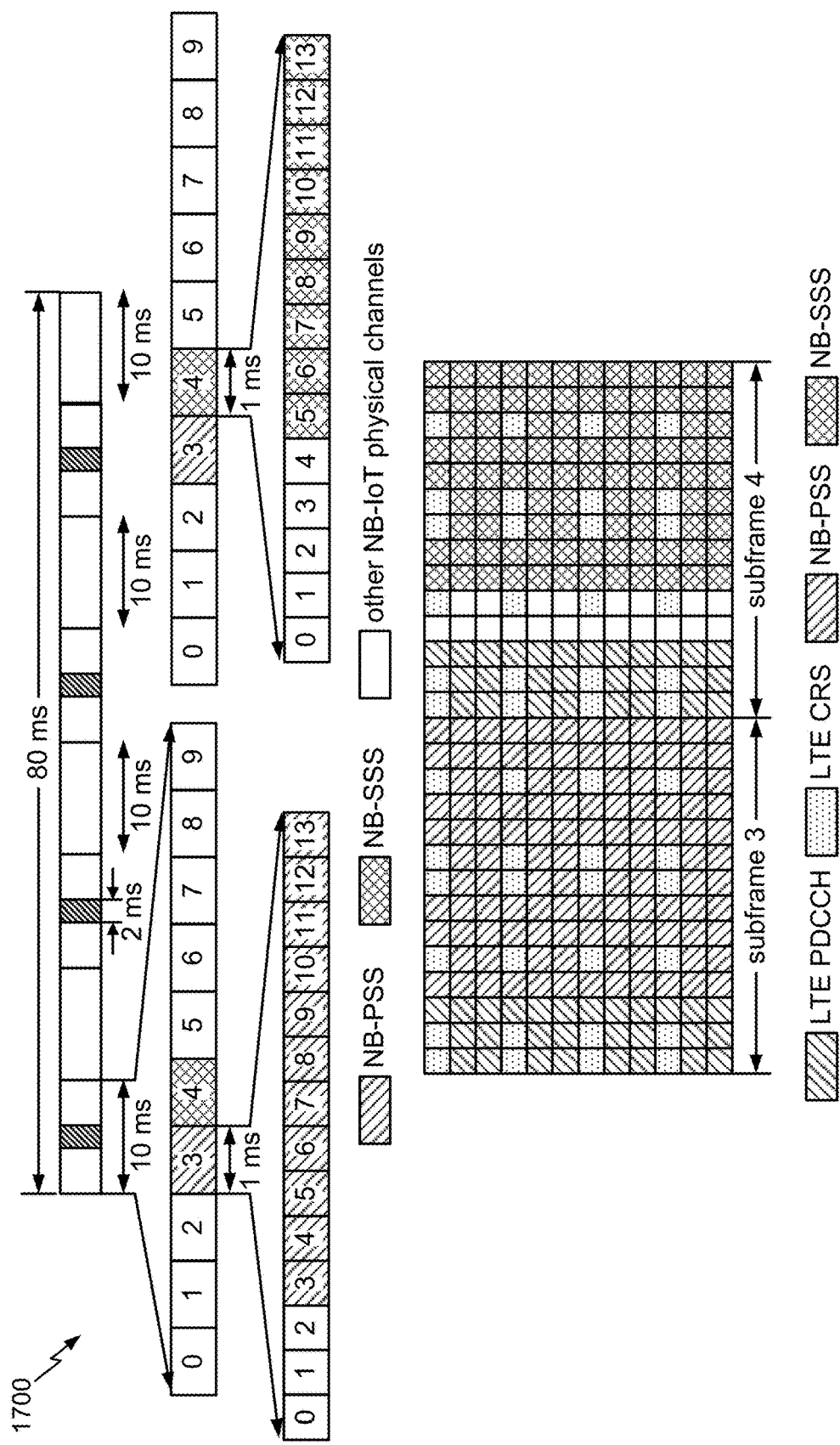
FIG. 17 illustrates an example resource allocation for the synchronization signals, according to aspects of the present disclosure.

When the sampling frequency is 1.92 MHz, there are N=137 samples in one PSS symbol, which can be obtained by size-128, zero-padded IFFT plus a CP of size-9. In an effort to comply with LTE symbol boundaries and maintain the periodic sequence structure, the PSS sequence may be aligned with the beginning of the $3^{rd}$ OFDM symbol (as shown in FIG. 17), and may stack one more sample at the end of the last PSS symbol by cyclic extension. Therefore, there will be 137×11+1 samples occupying the last 11 OFDM symbols of a L subframe.

Generated waveforms of the PSS symbol with CP length of 9 and 10 samples show a negligible difference. Therefore, a CP insertion scheme as shown in FIGS. 8-10, may be fully compatible with legacy LTE may be feasible, which introduces a CP of size-10 for the 5-th PSS symbol and keeps the same CP size for the rest of the PSS symbols. After removing the CP, the waveform of PSS symbol exhibits a central symmetric property (resulted from Zadoff-Chu sequence), which may be utilized to simplify the cross-correlation operation in the sequel.

The following observations can be made regarding the dual-layer NB-PSS sequence design. Each PSS symbol may embrace a full ZC sequence, therefore preserving the good correlation properties on symbol basis. The application of code cover randomizes the symbol pattern, therefore the good correlation properties may be extended across symbols. The NB-PSS sequence exhibits a periodic structure. In addition to the constant envelope of ZC sequence, overlap and add operations may be applied at PSS symbol boundaries in an effort to further reduce PAPR and CM values. The CP insertion of NB-PSS sequence may be made the same as that of legacy LTE. Accordingly, the entire PSS sequence may be fully aligned with the last 11 OFDM symbols of a legacy LTE subframe.

Figure 11:
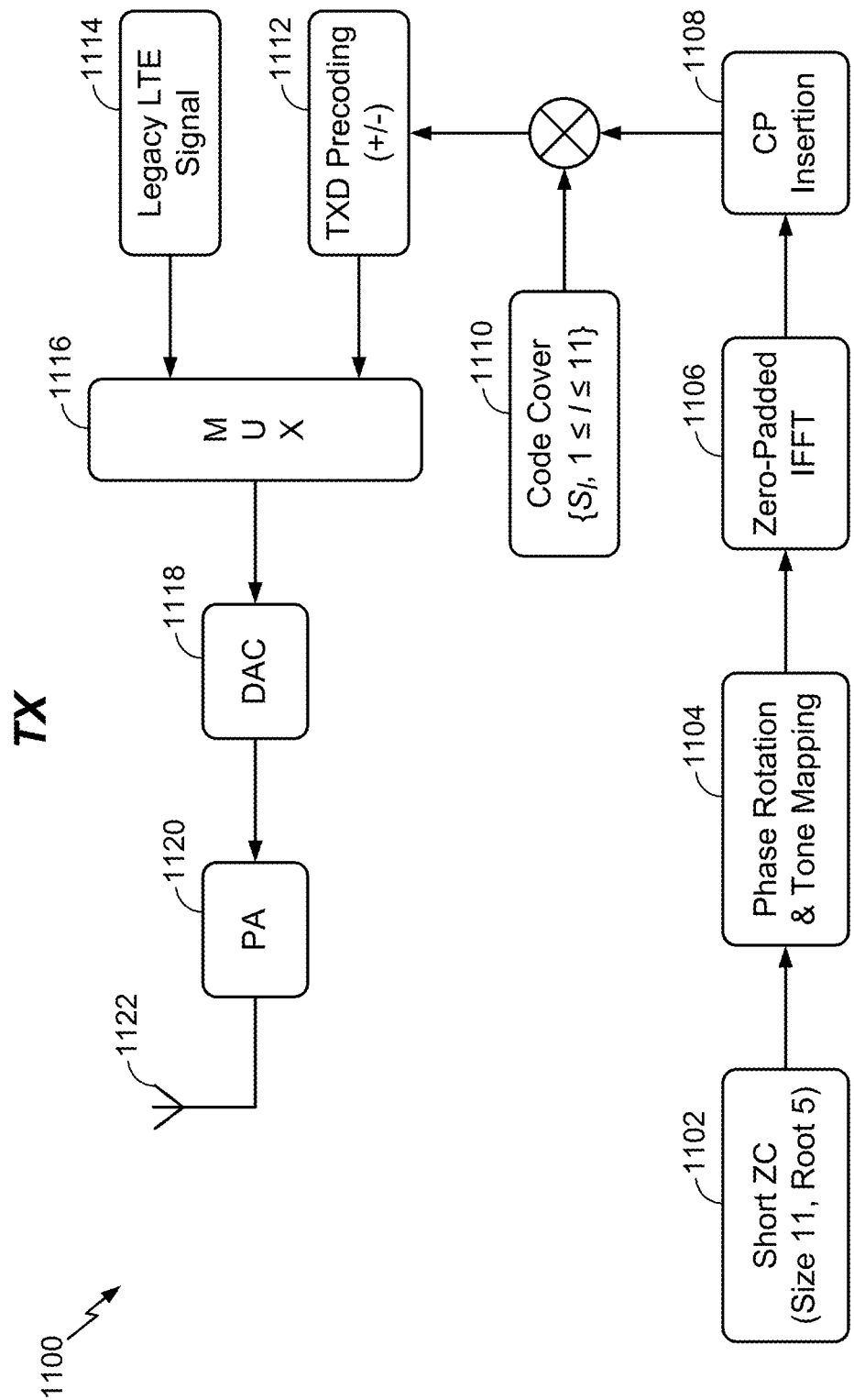
FIG. 11 illustrates example transmitter configured to transmit a PSS and SSS, according to aspects of the present disclosure.

FIG. 11 illustrates example components of a transmitter 1100 configured to transmit a NB-PSS and NB-SSS, according to aspects of the present disclosure. Following generation of a PSS and SSS generation, a transmitting entity, such as a BS, may transmit the generated synchronization signals to a receiving entity, such as a UE.

At 1102, a short Zadoff-Chu sequence of size 11 and root 5 may be applied to OFDM symbols. At 1104, the transmitter may perform phase rotation and tone mapping. At 1106, zero-padding IFFT may be performed to generate time domain samples for each PSS symbol. At 1108, CP insertion is performed for the PSS symbols. As binary code cover 1110 is applied to the time domain samples after CP insertion. At 1112, transmit diversity (TXD) precoding is performed. Multiplexer 1116 multiplexes an LTE signal 1114 with the precoded signal (from the output of TXD precoding 1112).

A digital-to-analog converter (DAC) 1118 may receive the multiplexed signal. The power amplifier (PA) 1120 may amplify signals prior to transmission by the antenna 1122.

Figure 12:
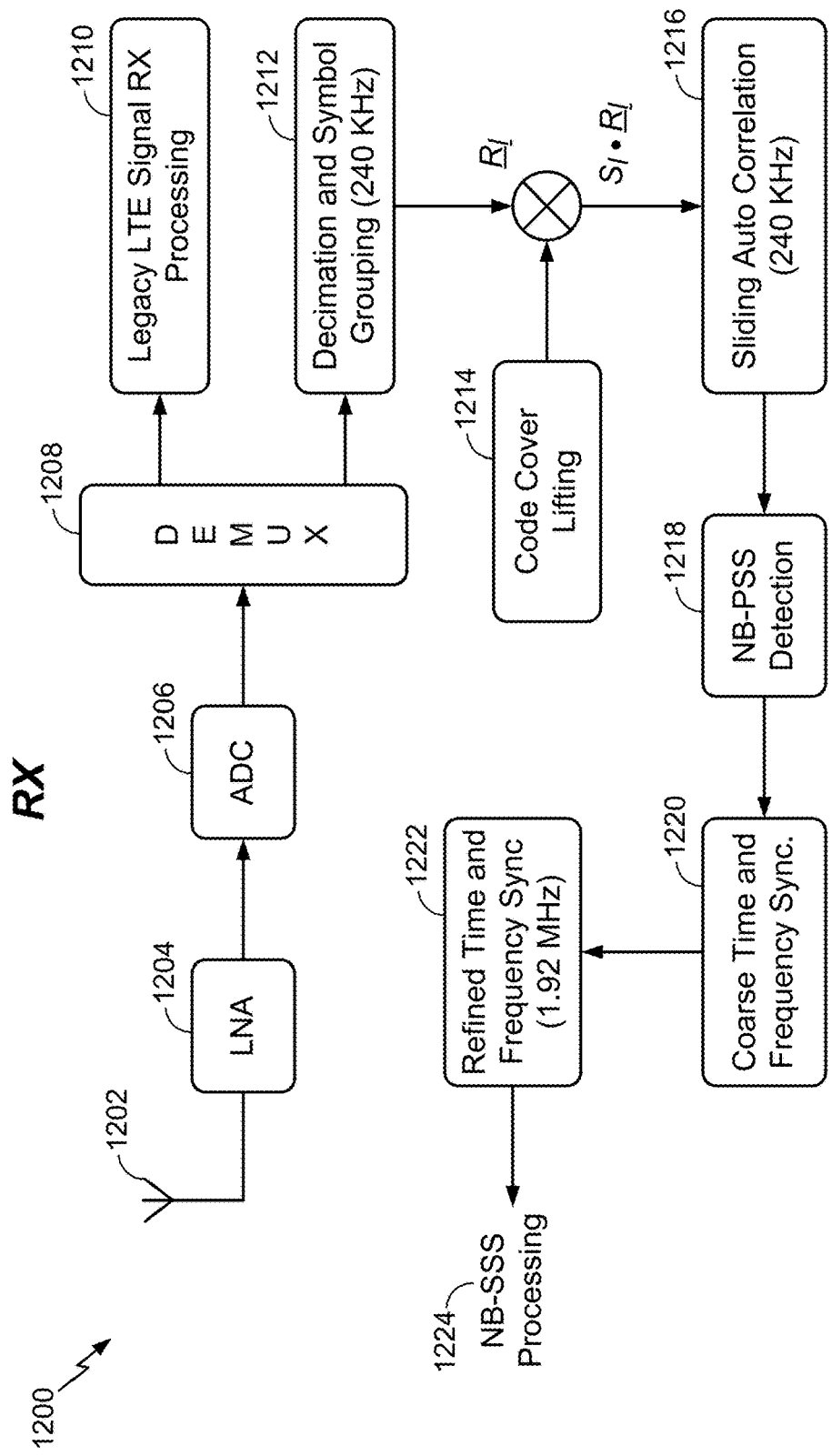
FIG. 12 illustrates an example receiver configured to receive a PSS and SSS, according to aspects of the present disclosure.

FIG. 12 illustrates example components of a receiver 1200 configured receive a NB-PSS and NB-SSS, according to aspects of the present disclosure. According to aspects, the receiver 1200 may be part of a UE.

The antenna 1202 may receive synchronization signals transmitted by a transmitting entity (e.g., a base station, including transmitter 1100 shown in FIG. 11). A low noise amplifier 1204 may amplify the received signals. An analog-to-digital converter (ADC) 1206 may convert the received signals for digital signal processing.

A demultiplexer 1208 may demutiplex the received signal to generate an LTE signal for LTE signal for LTE signal receive processing at 1210. The demultiplexer 1208 may also output signals for decimation and symbol grouping at 1212.

Code cover lifting 1214 may be applied to the symbols following decimation and symbol grouping. As will be described in more detail herein (e.g., in FIGS. 13 and 14), the UE may perform sliding autocorrelations at 1216 in an effort to detect a NB-PSS. At 1218, the UE may perform NB-PSS signal detection. At 1220, the UE may perform coarse time and frequency synchronization. At 1222, the UE may perform refined time and frequency synchronization. After the refined time and frequency synchronization, at 1224, the UE may perform NB-SSS processing.

Figure 13:
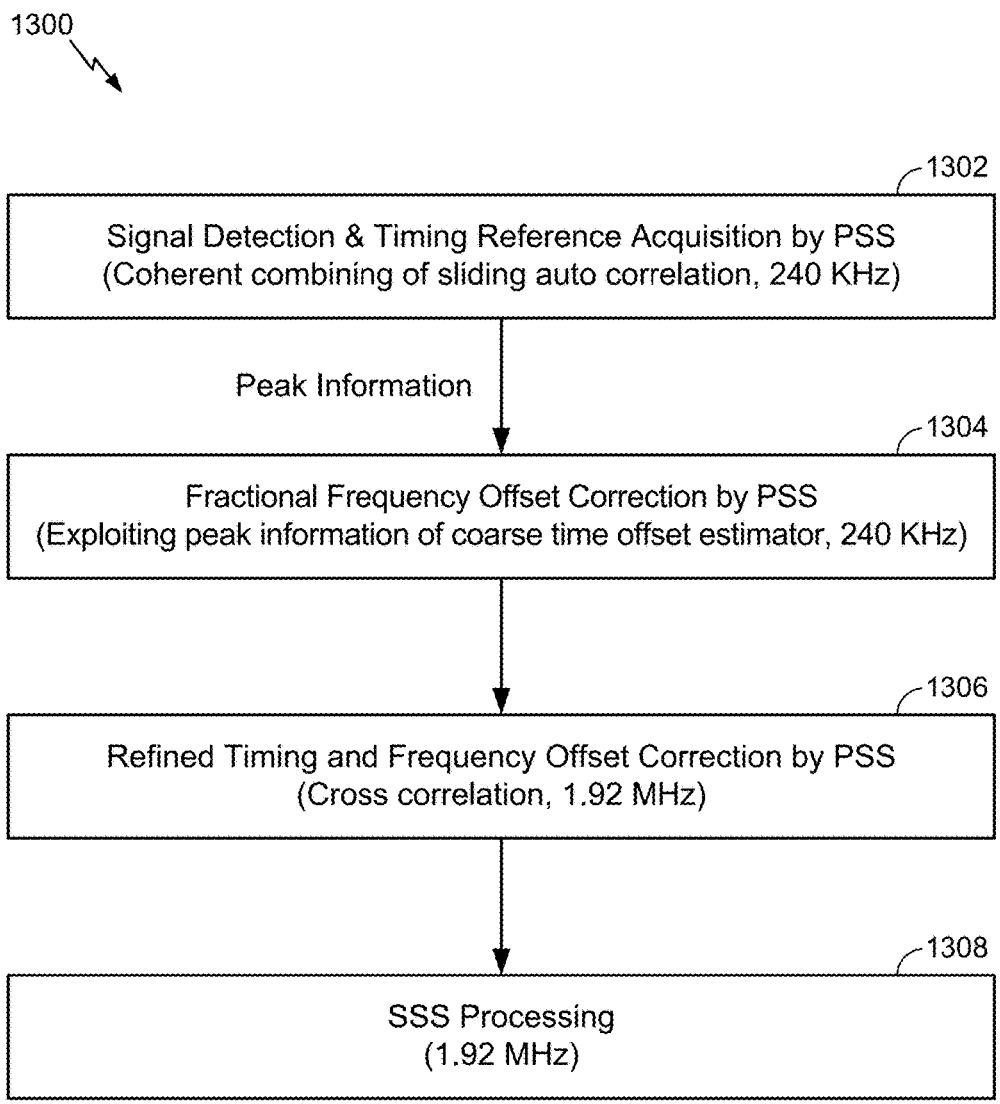
FIG. 13 illustrates an example receiver process flow diagram, according to aspects of the present disclosure.

FIG. 13 illustrates an example receiver process flow diagram 1300, according to aspects of the present disclosure. The UE may begin DL synchronization, at 1302, with signal detection and timing reference acquisition of PSS in the time domain. Signal detection and timing reference acquisition of a PSS may include coherent combining of sliding auto correlations. With the PSS peak information, determined via coherent combining of sliding auto correlations, the UE may, at 1304, perform fractional frequency offset correction based on the PSS (auto correlation in the time domain). UE complexity may be minimized because signal detection and timing reference acquisition 1302, fractional frequency offset correction 1304, and refined timing and frequency offset correction 1306 may all be performed in the time domain.

At 1306, the PSS may be used to perform refined timing and frequency offset correction. Thereafter, at 1308, the UE may process a SSS. The SSS may be used to decode not only a cell ID, but also additional information, such as subframe ID, and/or other system information including time/frequency drift.

Thus, similar to legacy LTE, the cell search procedures of NB-IoT devices may include frame start detection (PSS signal detection), symbol and frame timing offset estimation, CFO estimation, and physical cell ID identification. The first three operations mainly involve NB-PSS processing, whereas the last procedure is for NB-SSS.

For low-complexity implementation, PSS signal detection and time and frequency offset estimation may be implemented fully in time domain by leveraging the periodic structure of NB-PSS sequence and the central symmetrical property of a Zadoff-Chu sequence. Therefore, design of the PSS may be especially suitable for low-cost UEs powered on battery other non-rechargeable sources.

FIG. 14 illustrates an example receiver process flow diagram 1400, according to aspects of the present disclosure. The state transition for an NB-IoT searcher, illustrated in FIG. 14 provides additional details to the receiver process illustrated in FIG. 13. According to aspects, initial PSS signal detection with reduced sampling frequency may be performed by a UE in accordance with the following steps.

Steps 1402-1406 may be performed as a part of steps 1302 and 1304 in FIG. 13. At 1402, a sliding auto-correlation at 240 KHz may be performed until a peak is "found." If a peak is "found," the UE may, at 1404, estimate coarse timing and fractional frequency offset. The UE may, at 1406, perform cross-correlation at 240 KHz. After determining coarse timing and fractional frequency offsets and performing cross-correlation, if the peak is "rejected," the algorithm moves back to 1402, where the UE performs sliding auto-correlation, until a peak is found.

According to aspects, the UE may correlate the received signals with delayed and conjugate copies of the received signal. Second, the UE may sum the correlations corresponding to different lag sizes (integer multiples of PSS symbol length) individually. Third, the UE may take the absolute value of each sum individually. Fourth, the UE may sum the absolute values across all lags. Fifth, for low SNR and/or coverage extension cases, the first-fourth steps described above may be repeated, for example, every 20 ms (e.g., when PSS may be transmitted every 20 ms). The summed absolute values across all lags may be accumulated across multiple observation intervals spaced above by 20 ms. Accumulation values (e.g., from the fourth and fifths steps above) may be compared to a threshold in an effort to determine if a PSS signal is present. A PSS signal may be declared present if the accumulation value passes the threshold value.

After cross-correlation at 1406, if the PSS peak presence is "confirmed" (e.g., without additional information regarding integer frequency offset), the UE may, at 1408 perform cross correlation at 1.92 MHz. For example, after detecting a PSS signal, the UE may perform initial timing acquisition. According to aspects, the UE may repeat the first through fifth steps described above using a higher sampling frequency and around the location of the detected PSS signal. The UE may then find the peak of the accumulation and find the location of the peak as the starting point of PSS symbols. The refined frequency and timing offsets may be used, at 1410, for cell ID decoding and tracking.

The UE may perform initial frequency acquisition by first conducting an auto-correlation in the time domain after symbol timing detection to find the fractional carrier frequency offset (CFO). The UE may find an integer CFO by conducting cross-correlation in the time domain after the correction of fractional CFO. The UE may decode the SSS sequence after establishing timing and frequency references.

According to aspects, on the receiver side, sliding auto-correlation of NB-PSS sequence may be performed. The UE may construct a cost function for carrier frequency offset (CFO) decoupling (independent of CFO) timing offset. The cost function may be determined by coherently combining co-phased sub-vectors of PSS symbol pairs (given d), taking the absolute value of each sum, and accumulating across the span of the PSS sequence (11 symbols). The cost function may be expressed by coherent combining of PSS symbols and coherent accumulation of PSS re-transmissions. For example, assuming a RX signal vector starting from t=τ may be denoted by the concatenation of 11 sub-vectors γ(τ)=[R$_1$ R$_2$ ... R$_{11}$].

The code cover {s(l)} to γ, l=1, 2, ..., 11 may be applied. Then, symbol-wise correlation between adjacent and non-adjacent PSS symbols may be formed:

$$A_q(\tau) = \frac{1}{11-q}\sum_{l=1}^{11-q} s(l)s(l+q)R_{l+q}R_l^H,$$

$$q = 1, 2, \ldots, Q \text{ and } 3 \le Q \le 11$$

for example, when timing offset→0, $E[A_q(\tau)] \propto e^{jq\theta}$, where θ=mod(2πfT, 2π) is the CFO-induced phase rotation per symbol (T=PSS symbol duration with CP included).
Weighted combining (based on BLUE algorithm) may be performed using:

$$\rho(\tau) = w_1 \cdot A_1(\tau) + \Sigma_{q=2}^{Q} A_q^*(\tau) A_{q+1}(\tau)/|A_q^*(\tau)|,$$

$w_q \in (0,1]$ are obtained from BLUE algorithm, for example, when timing offset→0, $E[\rho(\tau)] \propto e^{j\theta}$.
Next, regarding coherent accumulation across PSS-retransmissions, the correlator output for the m-th SYNC period may be given by $\rho_m(\tau)$. Optional light weight filtering may be applied to $\rho_m(\tau)$ for smoothing. Coherent accumulation of correlator output by a-filter may be:

$$\rho_\Sigma(\tau) = \alpha\rho_\Sigma(\tau) + (1-\alpha)\rho_m(\tau), \ 0.5 < \alpha < 1.0.$$

The MLE of the timing offset may be expressed by $\hat{\tau} = \text{argmax}_\tau |\lambda(\tau)|$, for example, when timing offset→0, $E[\rho_\Sigma(\tau)] \propto e^{j\theta}$. Detection of PSS presence may be:

$$|\rho_\Sigma(\tau)/\bar{\rho}| \gtrless \text{Thld}.$$

Coarse Estimation of Timing Offset may be:

$$\hat{\tau} = \text{argmax}_\tau \rho_\Sigma(\tau).$$

Estimation of Frequency Offset (normalized by 15 KHz, pull-in range up to 30 KHz):

$$f \triangleq f_F + f_I, \text{ where } f_F \in \left(-\frac{64}{137}, \frac{64}{137}\right) \text{ and } f_I \in \left\{0, \pm\frac{128}{137}, \pm\frac{256}{137}\right\}$$

Estimation of $f_F$ can be obtained from the phase rotation of auto-correlator's "peak," by:

$$f_F = \left(\frac{128}{137}\right) \times \frac{1}{2\pi} \times \arg\{\rho_\Sigma(\text{coarse est. of timing offset})\}.$$

Estimation of $f_I$ can be obtained from cross-correlation of PSS sequence.
Refined estimation of timing and frequency offsets may be obtained through peak search of cross-correlation over a small time-frequency grid, which may be centered at the coarse timing and frequency offset estimation obtained via sliding autocorrelation.

Figure 15:
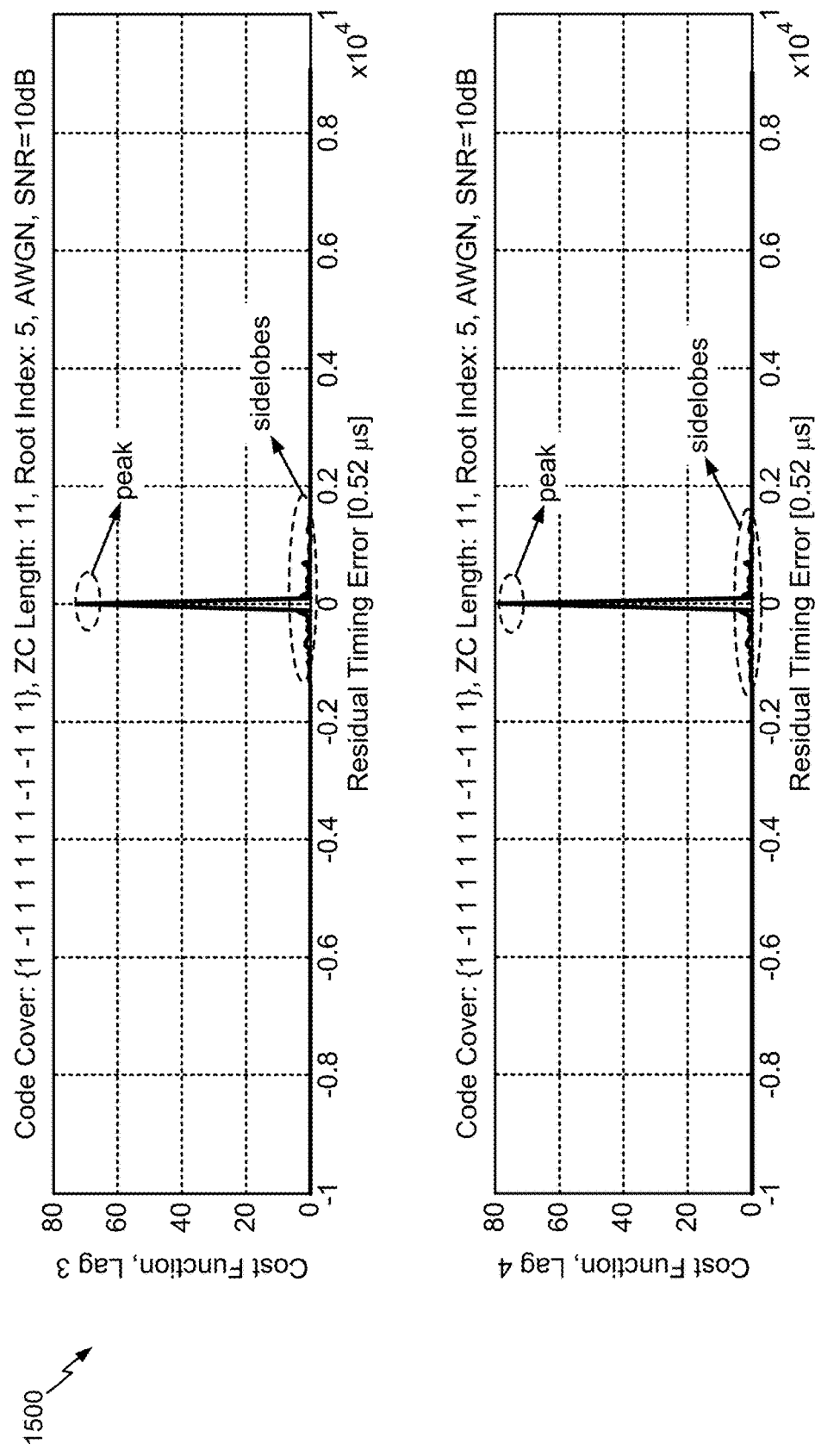
FIG. 15 illustrates an example for a sliding auto-correlation function, according to aspects of the present disclosure.

FIG. 15 illustrates an example for a sliding auto-correlation function 1500, according to aspects of the present disclosure.

Figure 16:
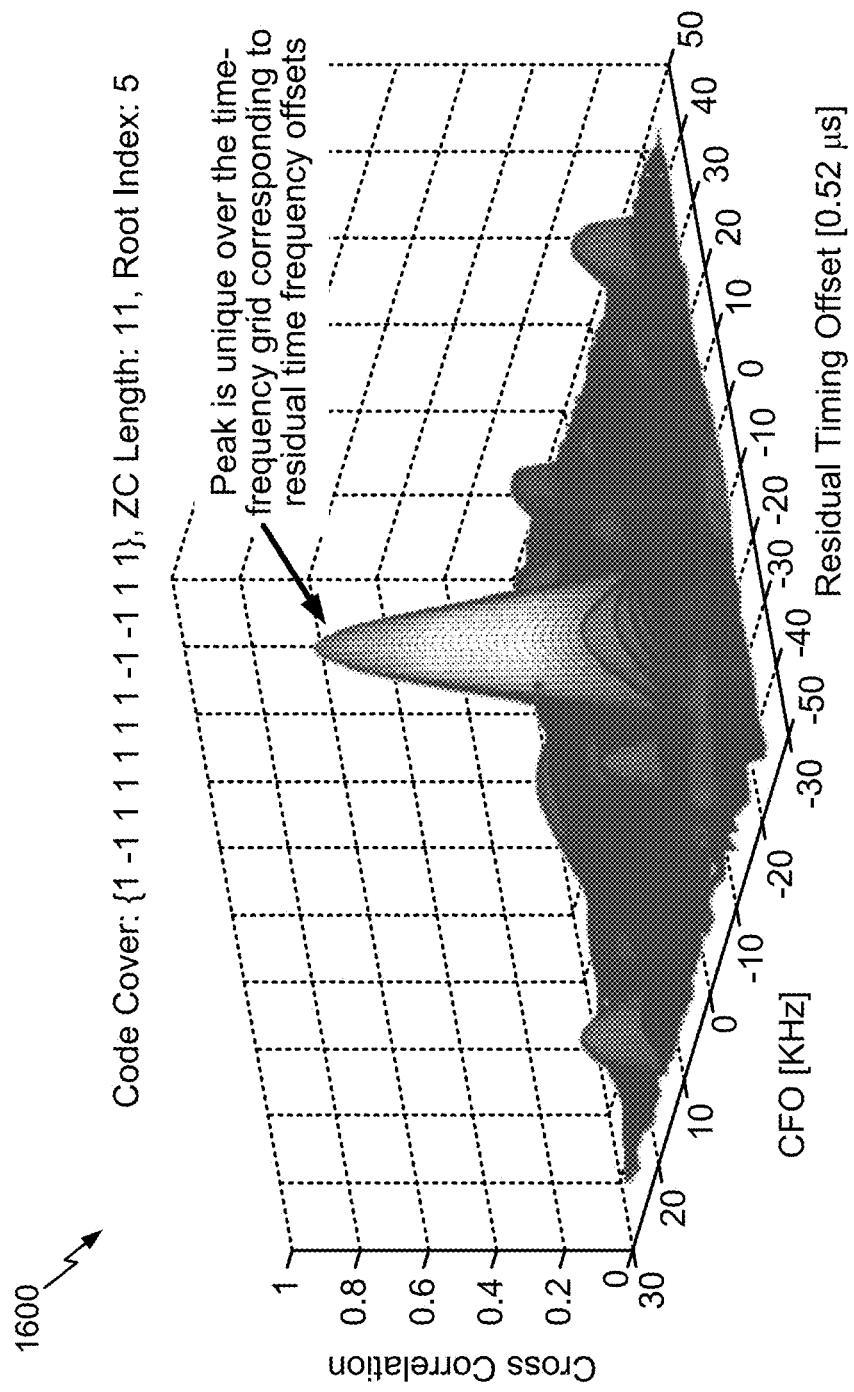
FIG. 16 illustrates an example for improving cross-correlation, according to aspects of the present disclosure.

FIG. 16 illustrates an example for improving cross-correlation 1600, according to aspects of the present disclosure, wherein the peak is unique over the time-frequency grid corresponding to residual time/frequency offsets.

Figure 18:
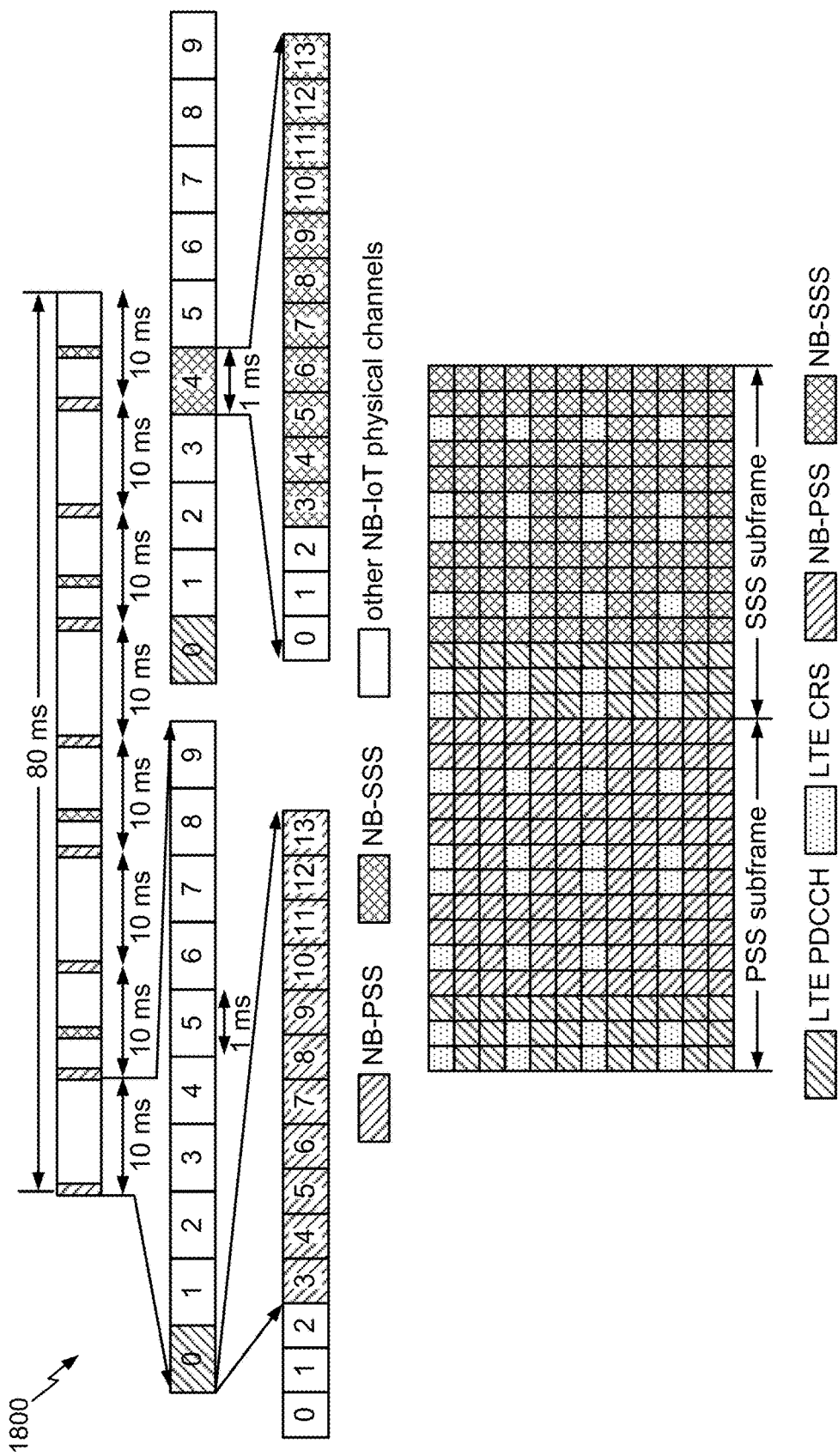
FIG. 18 illustrates an example resource allocation for the synchronization signals, according to aspects of the present disclosure.
Figure 19:
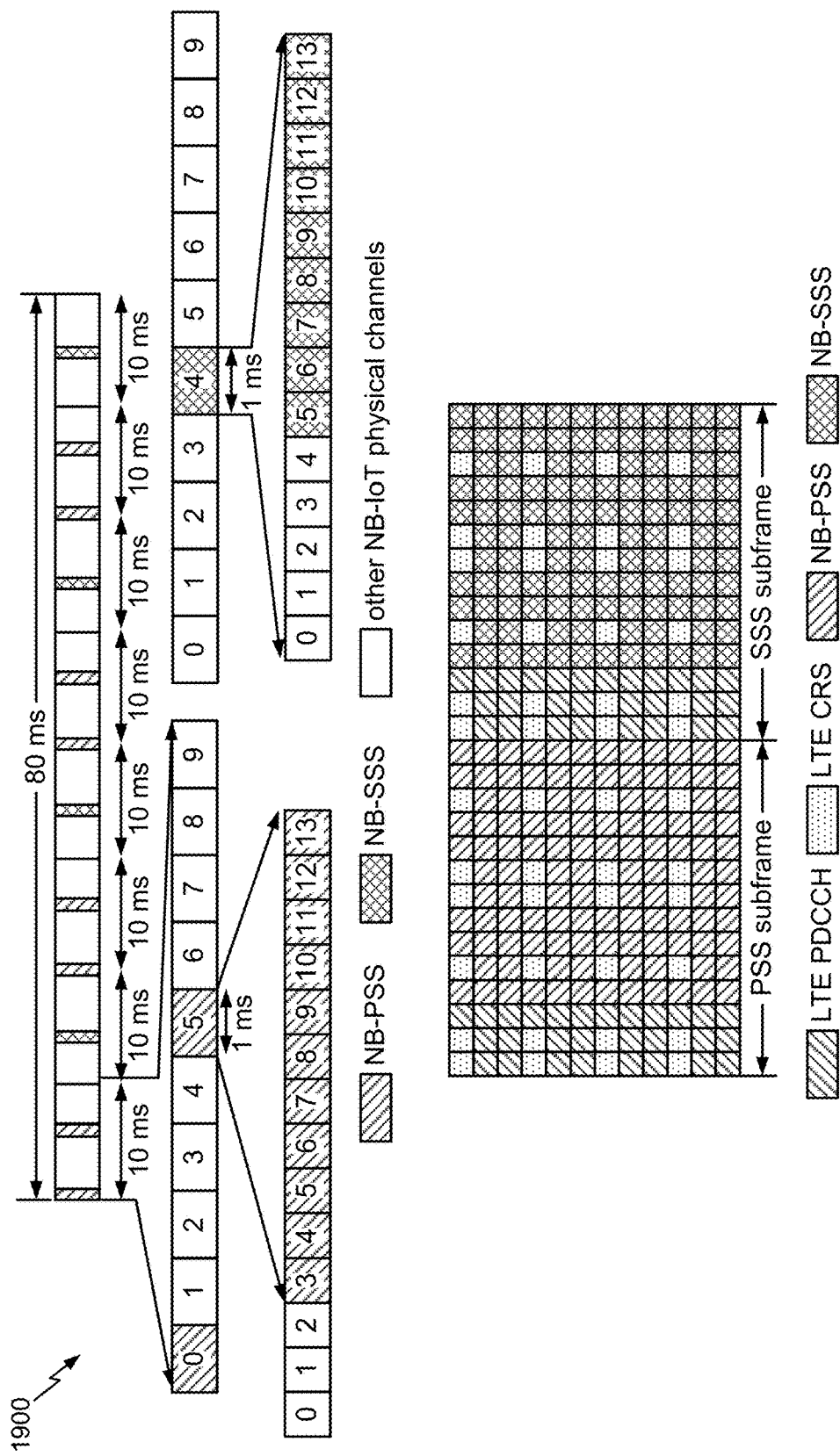
FIG. 19 illustrates an example resource allocation for the synchronization signals, according to aspects of the present disclosure.

FIGS. 17-19 illustrate an example resource allocation for the synchronization signals described herein. Multiple transmit opportunities for the PSS and SSS may be possible.

According to aspects, as shown in FIG. 17 there may be four transmit opportunities for the PSS and SSS in an 80 ms time period, which may enable reliable cell ID detection by a UE. According to aspects, the PSS may be transmitted in every frame. Additionally, the PSS and SSS may be transmitted in adjacent subframes (e.g., subframes 3 and 4) of a 10 ms frame. As described above, each PSS and SSS may be based on a short or full Zadoff-Chu sequence.

According to aspects, as shown in FIG. 18, the PSS may be transmitted on the same subframe of each radio frame. Advantageously, the PSS may be coherently combined with improved SNR. Interlaced transmission of PSS and its conjugate for early indication may be considered. Coherent combining/accumulation of auto-correlation may remain unchanged. However, the window length for accumulation/peak search may need to be doubled from 5 ms to 10 ms.

According to aspects, as shown in FIG. 19, the PSS may be retransmitted on subframe 0 and 5 of radio frames with an odd index. Advantageously, accumulation/peak search of auto-correlation may be based on a time slot of 5 ms in duration. However, for each 20 ms interval, only two of 4 slots will have a PSS signal. The other two if four slots may be noise only. Without knowledge of a frame start, 4 slots may need to be combined, with equal weights.

According to aspects, the PSS may be transmitted in subframe 5 of every radio frame. As described above, the PSS may occupy the last 11 OFDM symbols of subframe 5. The 11 OFDM symbols may be generated in the frequency domain based on a short Zadoff-Chu sequence of length 11, root 5, and no cyclic shift. The PSS may be mapped to 11 consecutive subcarriers of one PRB.

As described above, a PSS is a concatenation of OFDM symbols. An important part of the generation of ODFM symbols is the generation of CP. For legacy LTE, the OFDM symbols have different CP lengths. In other words, the OFDM symbols have an uneven CP length. Normal CP length for symbol #0 and symbol #7 is 10/1.92 µs and Normal CP length for the rest of the 12 symbols is 9/1.92 µs. Because NB-IoT may fit into legacy IoT framework, the NB-IoT CP length should also comply with legacy LTE. In other words, the NB-PSS should be backwards-compatible with legacy LTE.

Given transmission sampling rate of 1.92 MHz, NB-PSS symbols (prior to CP insertion) may be generated by zero-padded IFFT of size 128. Cyclic shift in the time domain may be introduced to maintain quasi-periodic structure of PSS symbols, as will be described with respect to FIG. 20. The cyclic shift in the time domain may be implemented by phase rotation in frequency domain.

As described above, for example, with reference to FIG. 8, a PSS base sequence given by length-11 Zadoff-Chu sequence with root index 5 may be:

$$Z_k = \exp\left(\frac{-j5\pi k(k+1)}{11}\right), k = 0, 1, \ldots, 10.$$

The phase-rotation for PSS symbol 1 may be:

$$\theta_{l,k} = \begin{cases} 0; & l \in \{3, 4, 5, 6\} \\ -2\pi(k-5)/128; & l \in \{7, 8, 9, 10, 11, 12, 13\} \end{cases}$$

Figure 20:
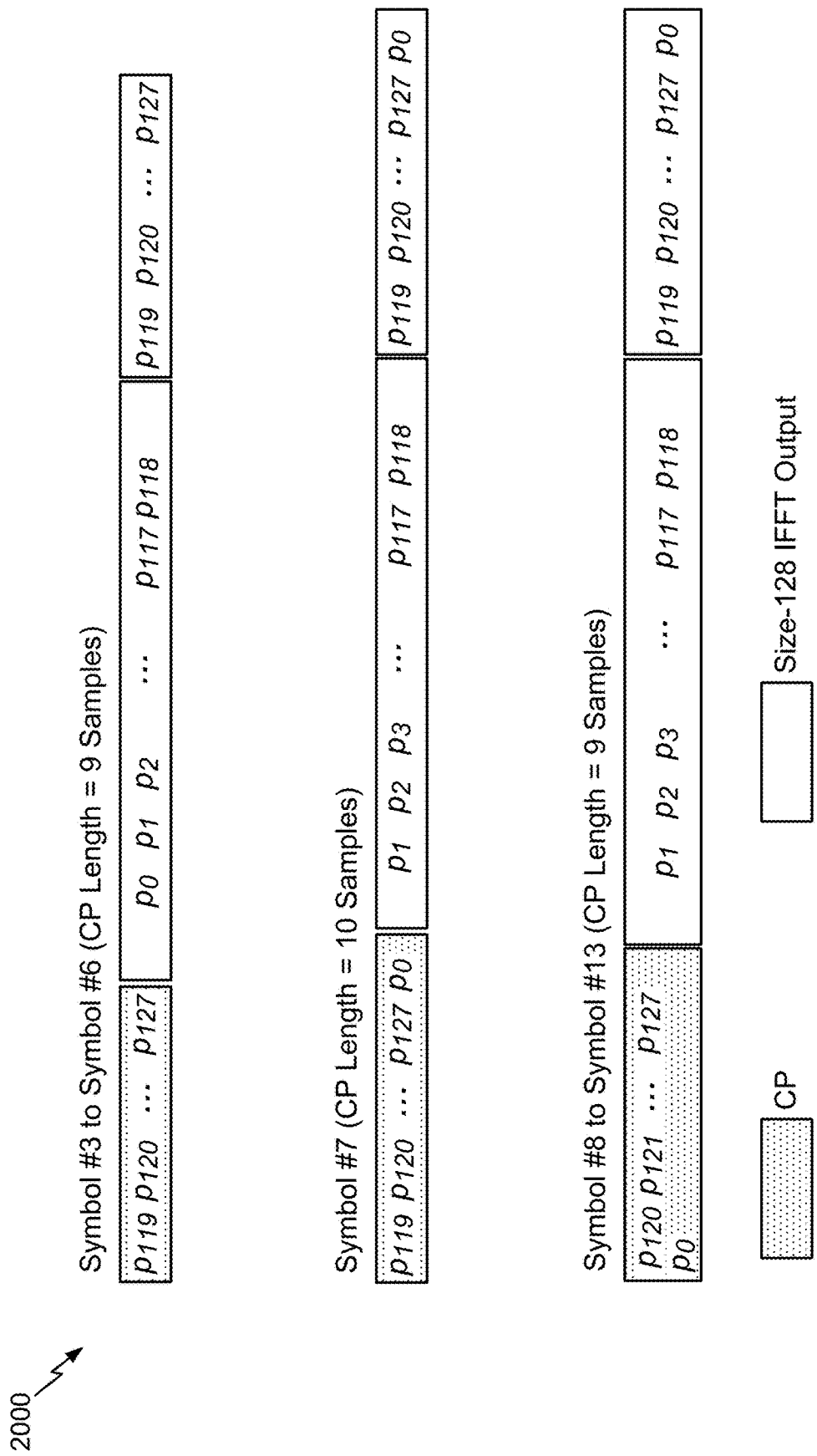
FIG. 20 illustrates time-domain cyclic shifts for NB-PSS symbols for non-even CP length, according to aspects of the present disclosure.

FIG. 20 illustrates time-domain cyclic shifts for NB-PSS symbols for non-even CP length. According to aspects a transmitter may use the non-even cyclic shifts while generating the PSS. As shown in FIG. 20, symbols #3-6 may have a CP length of 9 samples, symbol #7 may have a CP length of 10 samples, and symbol 8-13 may have a CP length of 9 samples.

The phase rotation may be derived assuming the sampling frequency=1.92 MHz.

$$W_N \triangleq \exp\left(\frac{-j2\pi}{128}\right)$$

The time domain samples without cyclic shift may be:

$$p_n \triangleq \sum_{k=0}^{10} \exp\left(\frac{-j5\pi k(k+1)}{11}\right) W_N^{-n(k-5)}, n = 0, 1, \ldots, 127$$

The frequency domain phase rotation for l≥7 may be:

$$\theta_{l,k} \triangleq -\frac{2\pi(k-5)}{128}, k = 0, 1, \ldots, 10$$

The cyclic shift of one sample in the time domain for l≥7 may be:

$$\hat{p}_n \triangleq \sum_{k=0}^{10} \exp\left(\frac{-j5\pi k(k+1)}{11}\right) \exp(j\theta_{l,k}) W_N^{-n(k-5)} = p_{mod(n+1,128)},$$

$$n = 0, 1, \ldots, 127$$

As described above, a BS may generate a primary synchronization signal (PSS) utilizing a binary code cover and at least one sequence applied to a number of symbols within one or more subframes of a frame. The BS may transmit the PSS and a secondary synchronization signal (SSS) to a first type of user equipment (UE) that communicates on one or more narrowband regions of a wider system bandwidth.

According to aspects, the at least one sequence may be selected from a set of candidate base sequences corresponding to a set of optimized PSS candidates.

The set of optimized PSS candidates may be evaluated using an optimization procedure involving a sliding auto-correlation function of candidate sequences for a given binary code cover.

A first type of user equipment (UE) that communicates on one or more narrowband regions of a wider system bandwidth may be configured to detect, within the one or more narrowband regions of the wider system bandwidth, a primary synchronization signal (PSS) generated utilizing a binary code cover and at least one sequence applied to a number of symbols within one or more subframes of a frame. The UE may perform an initial time and frequency acquisition based on the detected PSS and detect within the one or more narrowband regions, a secondary synchronization signal (SSS) to refine the initial time and frequency acquisition.

Performing the initial time and frequency acquisition may include a sliding auto-correlation procedure of the PSS in the time domain. The sliding auto-correlation procedure may involve performing symbol-wise correlation between adjacent and non-adjacent PSS symbols.

According to aspects, detection of the PSS may be performed based on PSS re-transmissions over a plurality of subframes. The detection of the PSS may involve coherent accumulation of PSS re-transmissions.

While some of the clean-slate PSS and SSS designs were described with response to NB-IoT, the described PSS and SSS designs may be extended to other clean-slate, OFDM based systems, such as eCC. For a wideband system such as eCC, the concatenation of PSS and SSS symbols may be done in the frequency domain, rather than in time domain. Correspondingly, the PSS and SSS processing at UE will be conducted across a block of RBs in the frequency domain Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a first type of user equipment (UE) that communicates on one or more narrowband regions of a wider system bandwidth, comprising:
    detecting, within the one or more narrowband regions of the wider system bandwidth, a primary synchronization signal (PSS) generated utilizing a binary code cover and at least one sequence applied to a number of symbols within one or more subframes of a frame, wherein:
        the binary code cover comprises a length=11 symbol sequence of [1 1 1 1 −1 −1 1 1 1 −1 1]; and
        the at least one sequence comprises a Zadoff-Chu sequence of size 11 with root index 5;
    performing a time and frequency acquisition based, at least in part, on the detected PSS;
    detecting, within the one or more narrowband regions, a secondary synchronization signal (SSS); and
    determining a cell identification (cell ID) based, at least in part, on the detected SSS.

2. The method of claim 1, wherein performing the time and frequency acquisition involves a sliding auto-correlation procedure of the PSS in the time domain.

3. The method of claim 2, wherein the sliding auto-correlation procedure involves performing symbol-wise correlation between adjacent and non-adjacent PSS symbols.

4. The method of claim 1, wherein:
    detection of the PSS is performed based on PSS re-transmissions over a plurality of subframes.

5. The method of claim 4, wherein the detection of the PSS involves coherent accumulation of PSS re-transmissions.

6. The method of claim 1, wherein the time and frequency acquisition are performed in the time domain.

7. The method of claim 1, wherein performing the time acquisition comprises:
    performing a coarse and fine symbol boundary estimation for the PSS.

8. The method of claim 7, wherein performing the frequency acquisition comprises:
    performing a fractional frequency offset correction, from the PSS, based on autocorrelation in time domain of the time-synchronized PSS to find a fractional carrier frequency offset (CFO); and
    performing an integer frequency offset correction, from the PSS, based a cross correlation between the PSS and a replica of the received signal in the time domain, to find an integer CFO of the PSS.

9. The method of claim 1, wherein the number of symbols are mapped to resource elements that have a same subcarrier spacing as resource elements used to communicate with a second type of UE that communicates on the wider system bandwidth.

10. The method of claim 9, wherein the PSS is received using resource elements of the one or more subframes not used for communicating with the second type of UE.

11. The method of claim 1, wherein the PSS and SSS are received on adjacent subframes of the frame.

12. The method of claim 1, further comprising:
    determining, from the SSS, additional system information.

13. The method of claim 12, wherein the additional system information comprises at least a subframe ID.

14. The method of claim 1, wherein at least one of the PSS or the SSS is based on a short Zadoff-Chu sequence.

15. A method for wireless communication by a base station (BS), comprising:
generating a primary synchronization signal (PSS) utilizing a binary code cover and at least one sequence applied to a number of symbols within one or more subframes of a frame, wherein:
the binary code cover comprises a length=11 symbol sequence of [1 1 1 1 −1 −1 1 1 1 −1 1]; and
the at least one sequence comprises a Zadoff-Chu sequence of size 11 with root index 5; and
transmitting the PSS and a secondary synchronization signal (SSS) to a first type of user equipment (UE) that communicates on one or more narrowband regions of a wider system bandwidth, wherein the SSS includes information for determining a cell identification (cell ID) associated with the BS.

16. The method of claim 15, wherein the at least one sequence is selected from a set of candidate base sequences corresponding to a set of optimized PSS candidates.

17. The method of claim 16, wherein the set of optimized PSS candidates are evaluated using an optimization procedure involving a sliding autocorrelation function of candidate sequences for a given binary code cover.

18. The method of claim 15, wherein the at least one sequence comprises a pair of sequences.

19. The method of claim 18, wherein the pair of sequences comprises one of orthogonal sequences or quasi-orthogonal sequences.

20. The method of claim 18, further comprising:
determining the pair of sequences based, at least in part, on an interpolation of Zadoff-Chu sequences.

21. The method of claim 15, wherein at least one of the PSS or the SSS is based on a short Zadoff-Chu sequence.

22. The method of claim 15, wherein transmitting the PSS and SSS comprises:
transmitting the PSS and SSS in adjacent subframes in the frame.

23. The method of claim 15, wherein the number of symbols are mapped to resource elements that have a same subcarrier spacing as resource elements used to communicate with a second type of UE that communicates on the wider system bandwidth.

24. The method of claim 23, wherein the PSS and SSS are transmitted using resource elements of the one or more subframes not used for communicating with the second type of UE.

25. The method of claim 15, wherein the SSS conveys additional system information.

26. The method of claim 25, wherein the additional system information comprises at least a subframe ID.

27. The method of claim 15, further comprising:
generating the SSS based on quasi-orthogonal sequences.

28. An apparatus for wireless communications by a first type of user equipment (UE) that communicates on one or more narrowband regions of a wider system bandwidth, comprising:
at least one processor configured to:
detect, within the one or more narrowband regions of the wider system bandwidth, a primary synchronization signal (PSS) generated utilizing a binary code cover and at least one sequence applied to a number of symbols within one or more subframes of a frame, wherein:
the binary code cover comprises a length=11 symbol sequence of [1 1 1 1 −1 −1 1 1 1 −1 1]; and
the at least one sequence comprises a Zadoff-Chu sequence of size 11 with root index 5;
perform a time and frequency acquisition based on the detected PSS;
detect, within the one or more narrowband regions, a secondary synchronization signal (SSS); and
determine a cell identification (cell ID) based, at least in part, on the detected SSS; and
a memory coupled with the at least one processor.

29. The apparatus of claim 28, wherein the at least one processor is configured to perform the time and frequency acquisition using a sliding auto-correlation procedure of the PSS in the time domain.

30. The apparatus of claim 29, wherein the sliding auto-correlation procedure involves performing symbol-wise correlation between adjacent and non-adjacent PSS symbols.

31. The apparatus of claim 28, wherein the at least one processor is configured to detect the PSS based on PSS re-transmissions over a plurality of subframes.

32. The apparatus of claim 31, wherein the at least one processor is configured to detect the PSS by coherent accumulation of PSS re-transmissions.

33. The apparatus of claim 28, wherein the at least one processor is configured to perform the time and frequency acquisition in the time domain.

34. The apparatus of claim 28, wherein the at least one processor is configured to perform the time acquisition by:
performing a coarse and fine symbol boundary estimation for the PSS.

35. The apparatus of claim 34, wherein the at least one processor is configured to perform the frequency acquisition by:
performing a fractional frequency offset correction, from the PSS, based on autocorrelation in time domain of the time-synchronized PSS to find a fractional carrier frequency offset (CFO); and
performing an integer frequency offset correction, from the PSS, based a cross correlation between the PSS and a replica of the received signal in the time domain, to find an integer CFO of the PSS.

36. The apparatus of claim 28, wherein the number of symbols are mapped to resource elements that have a same subcarrier spacing as resource elements used to communicate with a second type of UE that communicates on the wider system bandwidth.

37. The apparatus of claim 36, wherein the PSS is received using resource elements of the one or more subframes not used for communicating with the second type of UE.

38. The apparatus of claim 28, wherein the PSS and SSS are received on adjacent subframes of the frame.

39. The apparatus of claim 28, wherein the at least one processor is further configured to:
determine, from the SSS, additional system information.

40. The apparatus of claim 39, wherein the additional system information comprises at least a subframe ID.

41. The apparatus of claim 28, wherein at least one of the PSS or the SSS is based on a short Zadoff-Chu sequence.

42. An apparatus for wireless communication by a base station (BS), comprising:
at least one processor configured to:
generating a primary synchronization signal (PSS) utilizing a binary code cover and at least one sequence applied to a number of symbols within one or more subframes of a frame, wherein:
the binary code cover comprises a length=11 symbol sequence of [1 1 1 1 −1 −1 1 1 1 −1 1]; and
the at least one sequence comprises a Zadoff-Chu sequence of size 11 with root index 5;

transmit the PSS and a secondary synchronization signal (SSS) to a first type of user equipment (UE) that communicates on one or more narrowband regions of a wider system bandwidth, wherein the SSS includes information for determining a cell identification (cell ID) associated with the BS; and a memory coupled with the at least one processor.

43. The apparatus of claim 42, wherein the at least one sequence is selected from a set of candidate base sequences corresponding to a set of optimized PSS candidates.

44. The apparatus of claim 43, wherein the set of optimized PSS candidates are evaluated using an optimization procedure involving a sliding autocorrelation function of candidate sequences for a given binary code cover.

45. The apparatus of claim 42, wherein the at least one sequence comprises a pair of sequences.

46. The apparatus of claim 45, wherein the pair of sequences comprises one of orthogonal sequences or quasi-orthogonal sequences.

47. The apparatus of claim 45, wherein the at least one processor is further configured to:

determine the pair of sequences based, at least in part, on an interpolation of Zadoff-Chu sequences.

48. The apparatus of claim 42, wherein at least one of the PSS or the SSS is based on a short Zadoff-Chu sequence.

49. The apparatus of claim 42, wherein the at least one processor is configured to transmit the PSS and SSS by:

transmitting the PSS and SSS in adjacent subframes in the frame.

50. The apparatus of claim 42, wherein the number of symbols are mapped to resource elements that have a same subcarrier spacing as resource elements used to communicate with a second type of UE that communicates on the wider system bandwidth.

51. The apparatus of claim 50, wherein the at least one processor is configured to transmit the PSS and SSS using resource elements of the one or more subframes not used for communicating with the second type of UE.

52. The apparatus of claim 42, wherein the SSS conveys additional system information.

53. The apparatus of claim 52, wherein the additional system information comprises at least a subframe ID.

54. The apparatus of claim 42, wherein the at least one processor is further configured to:

generate the SSS based on quasi-orthogonal sequences.

\* \* \* \* \*